(12) United States Patent
Sloop et al.

(10) Patent No.: US 10,354,345 B2
(45) Date of Patent: Jul. 16, 2019

(54) OPTIMIZING AND CONTROLLING THE ENERGY CONSUMPTION OF A BUILDING

(71) Applicant: Earth Networks, Inc., Germantown, MD (US)

(72) Inventors: Christopher Dale Sloop, Mount Airy, MD (US); Michael Siemann, Bethesda, MD (US); Steven Gabriel, Takoma Park, MD (US)

(73) Assignee: Whisker Labs, Inc., Germantown, MD (US)

( * ) Notice: Subject to any disclaimer, the term of this patent is extended or adjusted under 35 U.S.C. 154(b) by 0 days.

(21) Appl. No.: 15/478,885

(22) Filed: Apr. 4, 2017

(65) Prior Publication Data

US 2017/0206615 A1    Jul. 20, 2017

Related U.S. Application Data

(63) Continuation-in-part of application No. 14/588,699, filed on Jan. 2, 2015, now Pat. No. 9,612,591, which
(Continued)

(51) Int. Cl.
*G06Q 50/06* (2012.01)
*G06Q 10/06* (2012.01)
(Continued)

(52) U.S. Cl.
CPC ............. *G06Q 50/06* (2013.01); *F24F 11/30* (2018.01); *F24F 11/62* (2018.01); *G05B 15/02* (2013.01);
(Continued)

(58) Field of Classification Search
CPC ................................. G06Q 50/06; F24F 11/62
(Continued)

(56) References Cited

U.S. PATENT DOCUMENTS

| 5,936,776 A | 8/1999 | Kreitzer |
| 6,098,893 A | 8/2000 | Berglund et al. |

(Continued)

FOREIGN PATENT DOCUMENTS

| CN | 101825327 A | 9/2010 |
| CN | 102156463 A | 8/2011 |

(Continued)

OTHER PUBLICATIONS

International Search Report and Written Opinion from PCT application No. PCT/US13/22734, dated Apr. 8, 2013, 14 pages.
(Continued)

*Primary Examiner* — Mohammad Ali
*Assistant Examiner* — Sheela Rao
(74) *Attorney, Agent, or Firm* — Proskauer Rose LLP

(57) ABSTRACT

Described herein are methods and systems, including computer program products, for determining a load control schedule for energy control devices using a load shifting optimization model and applying the load control schedule to adjust the energy control devices. A server receives thermodynamic models, energy price data and energy load forecast data. The server generates price probability distribution curves based upon the price data and load probability distribution curves based upon the load forecast data. The server executes a load shifting optimization model to determine a profit probability distribution curve for demand response decision rules. The server determines a profit curve that has an optimal profit value. The server generates a load control schedule based upon the optimal profit curve and generates operational parameters for energy control devices using the load control schedule. The server transmits the operational parameters to the energy control devices to adjust operational parameters.

26 Claims, 13 Drawing Sheets

Related U.S. Application Data is a continuation-in-part of application No. 13/729,501, filed on Dec. 28, 2012, now Pat. No. 9,261,863.

(60) Provisional application No. 61/589,639, filed on Jan. 23, 2012.

(51) Int. Cl.

| | |
|---|---|
| *G05D 23/19* | (2006.01) |
| *G05B 15/02* | (2006.01) |
| *F24F 11/30* | (2018.01) |
| *F24F 11/62* | (2018.01) |
| *F24F 110/10* | (2018.01) |
| *F24F 110/12* | (2018.01) |
| *F24F 140/60* | (2018.01) |
| *F24F 130/00* | (2018.01) |
| *F24F 130/10* | (2018.01) |
| *F24F 11/63* | (2018.01) |
| *F24F 11/52* | (2018.01) |

(52) U.S. Cl.
CPC ..... *G05D 23/1917* (2013.01); *G05D 23/1923* (2013.01); *G06Q 10/06313* (2013.01); *F24F 11/52* (2018.01); *F24F 11/63* (2018.01); *F24F 2110/10* (2018.01); *F24F 2110/12* (2018.01); *F24F 2130/00* (2018.01); *F24F 2130/10* (2018.01); *F24F 2140/60* (2018.01); *G05B 2219/2614* (2013.01); *G05B 2219/2639* (2013.01); *G05B 2219/2642* (2013.01); *Y02P 90/82* (2015.11); *Y04S 20/244* (2013.01)

(58) Field of Classification Search
USPC ........................................................ 700/291
See application file for complete search history.

(56) References Cited

U.S. PATENT DOCUMENTS

| | | | |
|---|---|---|---|
| 6,216,956 | B1 | 4/2001 | Ehlers et al. |
| 6,577,962 | B1 | 6/2003 | Afshari |
| 7,848,900 | B2 | 12/2010 | Steinberg et al. |
| 7,908,116 | B2 | 3/2011 | Steinberg et al. |
| 8,010,237 | B2 | 8/2011 | Cheung et al. |
| 8,019,567 | B2 | 9/2011 | Steinberg et al. |
| 8,090,477 | B1 | 1/2012 | Steinberg |
| 8,108,492 | B2 | 1/2012 | Arunachalam |
| 8,131,497 | B2 | 3/2012 | Steinberg et al. |
| 8,131,506 | B2 | 3/2012 | Steinberg et al. |
| 8,340,826 | B2 | 12/2012 | Steinberg |
| 9,261,863 | B2 | 2/2016 | Sloop et al. |
| 9,471,082 | B2 | 10/2016 | Sloop et al. |
| 9,612,591 | B2 | 4/2017 | Sloop et al. |
| 2003/0050737 | A1 | 3/2003 | Osann, Jr. |
| 2005/0096797 | A1 | 5/2005 | Matsubara et al. |
| 2005/0102068 | A1 | 5/2005 | Pimputkar et al. |
| 2005/0119766 | A1 | 6/2005 | Amundson et al. |
| 2005/0171645 | A1 | 8/2005 | Oswald et al. |
| 2006/0255165 | A1 | 11/2006 | Ha |
| 2007/0112939 | A1 | 5/2007 | Wilson et al. |
| 2010/0019050 | A1 | 1/2010 | Han et al. |
| 2010/0106334 | A1 | 4/2010 | Grohman et al. |
| 2010/0241287 | A1 | 9/2010 | Nishino et al. |
| 2010/0332373 | A1 | 12/2010 | Crabtree et al. |
| 2011/0178977 | A1 | 7/2011 | Drees |
| 2011/0218690 | A1 | 9/2011 | O'Callaghan et al. |
| 2013/0006047 | A1 | 1/2013 | Hicks et al. |
| 2013/0060471 | A1 | 3/2013 | Aschheim et al. |
| 2013/0073094 | A1 | 3/2013 | Knapton et al. |
| 2013/0190940 | A1 | 7/2013 | Sloop et al. |
| 2014/0100699 | A1 | 4/2014 | Guidotti et al. |
| 2014/0365017 | A1 | 12/2014 | Hanna et al. |
| 2015/0192911 | A1 | 7/2015 | Sloop et al. |
| 2016/0154417 | A1 | 6/2016 | Sloop et al. |

FOREIGN PATENT DOCUMENTS

| | | |
|---|---|---|
| CN | 102193544 A | 9/2011 |
| GB | 2448896 A | 11/2008 |
| JP | 6288595 A | 10/1994 |
| JP | 2002364901 A | 12/2002 |
| JP | 2004205202 A | 7/2004 |
| JP | 2010065960 A | 3/2010 |
| JP | 2011197904 A | 10/2011 |
| WO | 2011072332 A1 | 6/2011 |

OTHER PUBLICATIONS

Non-Final Office Action from U.S. Appl. No. 13/729,501, dated Mar. 20, 2015, 31 pages.
Final Office Action from U.S. Appl. No. 13/729,501, dated Sep. 30, 2015, 47 pages.
International Search Report and Written Opinion from PCT application No. PCT/US15/68360, dated Feb. 19, 2016, 15 pages.
Aldrich, Robb, "Alternative Energy," Whole Building Design Guide, Oct. 23, 2014, retrieved from https://www.wbdg.org/resources/alternativeenergy.php on Feb. 16, 2016, 4 pages.
Non-Final Office Action from U.S. Appl. No. 14/588,699, dated May 4, 2016, 29 pages.
Examination Report from Australian Patent Application No. 2013212256, dated Oct. 14, 2016, 3 pages.
Examination Report from Australian Patent Application No. 2013212256, dated Aug. 10, 2017, 3 pages.
Search and Examination Report from European Patent Application No. 13740823.3, dated Nov. 5, 2015, 5 pages.
Office Action from Japanese Patent Application No. 2014-554794, dated Dec. 6, 2016, 6 pages.

OPTIMIZING AND CONTROLLING THE ENERGY CONSUMPTION OF A BUILDING

RELATED APPLICATIONS

This application is a continuation-in-part of U.S. patent application Ser. No. 14/588,699, filed Jan. 2, 2015, which is a continuation-in-part of U.S. patent application Ser. No. 13/729,501, filed Dec. 28, 2012, which claims priority to Ser. No. 61/589,639, filed on Jan. 23, 2012, the entire disclosure of which is incorporated herein by reference.

TECHNICAL FIELD

The technology relates generally to optimizing and controlling the energy consumption of a building.

BACKGROUND

Weather is the largest variable impacting home energy demand. Many homes are equipped with a standard thermostat to regulate heating and cooling, where the occupant either manually adjusts the temperature to account for weather conditions or the thermostat automatically adjusts temperature based on a predetermined schedule. The automatic adjustment of temperature may be conducted by a utility that provides power to the home, but often such adjustments are based on incomplete or inaccurate weather information for the precise location of the home and do not factor in the occupant's personal preferences. In addition, these systems are generally not capable of accounting for the thermal characteristics of the particular building in which the thermostat is installed.

As a result, such systems react to current weather conditions and temperature needs of the home, rather than performing pre-heating and/or pre-cooling based on forecast weather conditions and the energy characteristics of the home.

SUMMARY

The techniques described herein relate to optimizing energy use of a building (e.g., home) by dynamically controlling comfort devices of the building (such as thermostats, fans, shades, doors, windows, humidifiers, appliances, other heating/cooling systems) to change the comfort characteristics of the building such as pre-heating, pre-cooling, and the like in response to local weather forecast conditions and when a demand response event is anticipated. In addition, the techniques provide the advantage of maintaining a desired comfort level for occupants of the building while encouraging efficient energy usage and monitoring.

In one aspect, the invention features a method for optimizing and controlling the energy consumption of a building. A first computing device receives one or more measurements from a plurality of sensors, at least some of which are located inside the building, where the measurements include temperature readings and comfort characteristics. The first computing device generates a set of thermal response coefficients for the building based on energy characteristics of the building, the measurements from the sensors, and weather data associated with the location of the building. The first computing device predicts an energy response of the building based on the set of thermal response coefficients and forecasted weather associated with the location of the building. The first computing device selects minimal energy requirements of the building based on an energy consumption cost associated with the building and determines one or more energy control points for the building based on the energy response and the minimal energy requirements. The first computing device transmits the energy control points to one or more comfort devices in the building.

In another aspect, the invention features a system for optimizing and controlling the energy consumption of a building. The system includes a first computing device configured to receive one or more measurements from a plurality of sensors, at least some of which are located inside the building, where the measurements include temperature readings and comfort characteristics. The first computing device is configured to generate a set of thermal response coefficients for the building based on energy characteristics of the building, the measurements from the sensors, and weather data associated with the location of the building. The first computing device is configured to predict an energy response of the building based on the set of thermal response coefficients and forecasted weather associated with the location of the building. The first computing device is configured to select minimal energy requirements of the building based on an energy consumption cost associated with the building and determine one or more energy control points for the building based on the energy response and the minimal energy requirements. The first computing device is configured to transmit the energy control points to one or more comfort devices in the building.

In another aspect, the invention features a computer program product, tangibly embodied in a non-transitory computer readable storage medium, for optimizing and controlling the energy consumption of a building. The computer program product includes instructions operable to cause a first computing device to receive one or more measurements from a plurality of sensors, at least some of which are located inside the building, where the measurements include temperature readings and comfort characteristics. The computer program product includes instructions operable to cause the first computing device to generate a set of thermal response coefficients for the building based on energy characteristics of the building, the measurements from the sensors, and weather data associated with the location of the building. The computer program product includes instructions operable to cause the first computing device to predict an energy response of the building based on the set of thermal response coefficients and forecasted weather associated with the location of the building. The computer program product includes instructions operable to cause the first computing device to select minimal energy requirements of the building based on an energy consumption cost associated with the building and determine one or more energy control points for the building based on the energy response and the minimal energy requirements. The computer program product includes instructions operable to cause the first computing device to transmit the energy control points to one or more comfort devices in the building.

In another aspect, the invention features a system for optimizing and controlling the energy consumption of a building. The system includes means for receiving one or more measurements from a plurality of sensors, at least some of which are located inside the building, where the measurements include temperature readings and comfort characteristics. The system includes means for generating a set of thermal response coefficients for the building based on energy characteristics of the building, the measurements from the sensors, and weather data associated with the location of the building. The system includes means for predicting an energy response of the building based on the set of thermal response coefficients and forecasted weather associated with the location of the building. The system includes means for selecting minimal energy requirements of the building based on an energy consumption cost associated with the building and determines one or more energy control points for the building based on the energy response and the minimal energy requirements. The system includes means for transmitting the energy control points to one or more comfort devices in the building.

Any of the above aspects can include one or more of the following features. In some embodiments, the first computing device compares the temperature readings from one or more sensors to a temperature measurement provided by a thermostat inside the building and adjusts the energy control points based upon the comparison. In some embodiments, the energy control points include thermostat set points, control settings for the comfort devices, and control settings for window shades. In some embodiments, the comfort characteristics include occupancy status of a building area, humidity, radiative heat from walls, operational status for the comfort devices, a location of a building occupant, a distance of the building occupant from the building, and a travel time for the occupant to arrive at the building. In some embodiments, the first computing device adjusts the energy control points based upon the travel time and/or the distance.

In some embodiments, the energy characteristics include one or more temperature readings from the sensors, a temperature reading from a thermostat of the building, a status of an HVAC system in the building, a status of one or more energy sources supplying the building, and status of doors and/or windows of the building. In some embodiments, the HVAC system includes one or more stage heating or cooling units. In some embodiments, the energy sources supplying the building include electric, gas, solar, wind, heat pump, and energy control devices.

In some embodiments, generating the set of thermal response coefficients is further based on physical data of the building. In some embodiments, the physical data comprises at least one of: thermal mass, wind infiltration, relative area of windows, amount of insulation, material of construction, wind infiltration of the building, and efficiency of an associated HVAC system. In some embodiments, predicting an energy response is further based on the energy consumption cost associated with the building. In some embodiments, the energy consumption cost represents an amount of power required to change a comfort level of the building for various external temperatures.

In some embodiments, the minimal energy requirements comprise a power consumption amount of an HVAC system in the building and a duty cycle of the HVAC system. In some embodiments, determining energy control points is further based on weather forecast data, a comfort preference provided by an occupant of the building, or both.

In some embodiments, the energy control points transmitted to the thermostat comprise a schedule for control of the thermostat over a period of time. In some embodiments, the first computing device receives the weather data from a network of remote sensors. In some embodiments, the first computing device receives thermostat data from a device connected to an HVAC system inside the building.

In some embodiments, the first computing device adjusts the generated set of thermal response coefficients using error correction. In some embodiments, the error correction includes filtering anomalies from the generated set of thermal response coefficients.

In some embodiments, the weather data includes current weather conditions at the location of the building, forecast weather conditions for the location of the building, solar load at the location of the building, or any combination thereof. In some embodiments, the first computing device compares the predicted energy response of the building to a predicted energy response of one or more other buildings and ranks the predicted energy response of the building based on the comparison of the predicted energy response. In some embodiments, generating a set of thermal response coefficients for the building is further based on smart meter data.

In some embodiments, the plurality of sensors include combination door status and temperature sensors, combination window status and temperature sensors, combination appliance status and temperature sensors, combination motion detection and temperature sensors, infrared thermal sensors, standalone temperature sensors, and humidity sensors. In some embodiments, the first computing device receives a signal from a combination door status and temperature sensor, determines whether a door associated with the combination door status and temperature sensor is open or closed based upon the signal, and identifies an energy loss issue for the door if the door is closed and a temperature reading from the combination door status and temperature sensor diverges from a temperature measurement of a thermostat in the building. In some embodiments, the first computing device transmits an alert to a remote computing device associated with an occupant of the building if an energy loss issue is identified. In some embodiments, the alert includes an energy efficiency scorecard for the building and identifies the energy loss issue.

In some embodiments, the first computing device receives a motion detection signal and a temperature signal from one or more sensors, determines an occupancy status of an area monitored by the one or more sensors based upon the motion detection signal, and adjusts the energy control points based upon the occupancy status and the temperature signal. In some embodiments, the comparison step includes determining whether changes over time in the sensor temperature measurements correspond to changes over time in a temperature measurement of a thermostat in the building. In some embodiments, the first computing device determines an energy loss issue corresponding to an area of the building in which the sensor is located when the changes over time in the sensor temperature measurements diverge from the changes over time in the thermostat temperature measurement. In some embodiments, the adjusting step comprises changing the energy control points to account for a difference between the sensor temperature measurements and the thermostat temperature measurement.

The invention, in another aspect, features a method for determining a load control schedule for a plurality of energy control devices using a load shifting optimization model and applying the load control schedule to adjust the plurality of energy control devices. A server computing device receives one or more thermodynamic grey-box models, where each thermodynamic grey-box model is associated with one or more buildings. The server computing device receives energy price data associated with a utility provider servicing the one or more buildings and energy load forecast data associated with the one or more buildings. The server computing device generates one or more price probability distribution curves based upon the energy price data. The server computing device generates one or more load probability distribution curves based upon the energy load forecast data. The server computing device executes a load shifting optimization model using the one or more price probability distribution curves, the one or more load probability distribution curves, and an energy sale price to determine a profit probability distribution curve for each of a plurality of demand response decision rules. The server computing device determines at least one of the profit probability distribution curves that has an optimal profit value. The server computing device generates a load control schedule for each of a plurality of energy control devices coupled to the server computing device based upon the profit probability distribution curve that has the optimal profit value. The server computing device generates one or more operational parameters for each of the plurality of energy control devices using the load control schedule. The server computing device transmits the one or more operational parameters to the plurality of energy control devices, where the energy control devices adjust one or more of current and future operational parameters based upon the received operational parameters.

The invention, in another aspect, features a system for determining a load control schedule for a plurality of energy control devices using a load shifting optimization model and applying the load control schedule to adjust the plurality of energy control devices. The system comprises a server computing device that receives one or more thermodynamic grey-box models, where each thermodynamic grey-box model is associated with one or more buildings. The server computing device receives energy price data associated with a utility provider servicing the one or more buildings and energy load forecast data associated with the one or more buildings. The server computing device generates one or more price probability distribution curves based upon the energy price data. The server computing device generates one or more load probability distribution curves based upon the energy load forecast data. The server computing device executes a load shifting optimization model using the one or more price probability distribution curves, the one or more load probability distribution curves, and an energy sale price to determine a profit probability distribution curve for each of a plurality of demand response decision rules. The server computing device determines at least one of the profit probability distribution curves that has an optimal profit value. The server computing device generates a load control schedule for each of a plurality of energy control devices coupled to the server computing device based upon the profit probability distribution curve that has the optimal profit value. The server computing device generates one or more operational parameters for each of the plurality of energy control devices using the load control schedule. The server computing device transmits the one or more operational parameters to the plurality of energy control devices, where the energy control devices adjust one or more of current and future operational parameters based upon the received operational parameters.

Any of the above aspects can include one or more of the following features. In some embodiments, each thermodynamic grey-box model is based upon one or more characteristics of an indoor environment of a building and a flow of energy through an envelope of the building. In some embodiments, the energy price data is one or more of historical energy price data and per-hour price probability data. In some embodiments, the energy load forecast data is one or more of historical load data and load forecast probability data.

In some embodiments, executing the load shifting optimization model comprises: determining a demand response decision rule; generating a vector of simulated market prices using at least one of the price probability distribution curves; generating a vector of simulated loads using at least one of the load probability distribution curves; applying the demand response decision rule to the vector of simulated market prices and the vector of simulated loads to generate the profit probability distribution curve for the demand response decision rule; and determining a profit value associated with the profit probability distribution curve using the energy sale price. In some embodiments, the server computing device repeats the execution of the load shifting optimization model for each combination of the plurality of demand response decision rules, the one or more price probability distribution curves, and the one or more load probability distribution curves to generate a plurality of profit values.

In some embodiments, determining at least one of the profit probability distribution curves that has an optimal profit value comprises selecting the profit probability curve that is associated with a maximum profit value. In some embodiments, the server computing device determines a risk value associated with the profit probability distribution curve using the energy sale price. In some embodiments, determining at least one of the profit probability distribution curves that has an optimal profit value comprises selecting the profit probability curve that is associated with a minimum risk value.

In some embodiments, the one or more operational parameters for each of a plurality of energy control devices comprise thermostat setpoints. In some embodiments, the thermostat setpoints comprise a schedule of current and future temperature settings for the thermostat. In some embodiments, the one or more operational parameters for each of a plurality of energy control devices comprise operational settings for a comfort device. In some embodiments, the operational settings for a comfort device comprise a schedule of current and future operational settings for the comfort device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
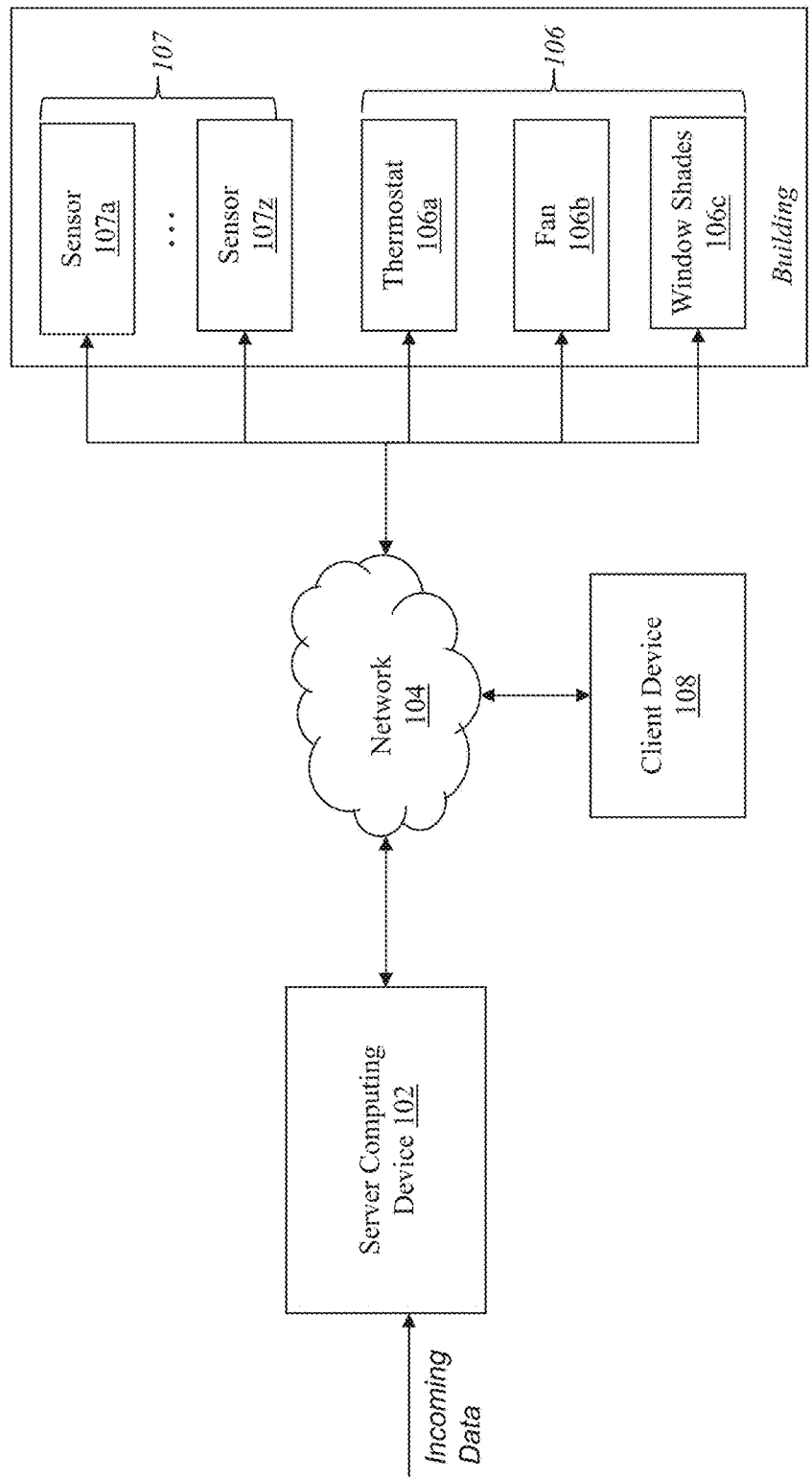
FIG. 1 is a block diagram of a system for optimizing and controlling the energy consumption of a building.

FIG. 1 is a block diagram of a system 100 for optimizing and controlling the energy consumption of a building. The system 100 includes a server computing device 102, a communications network 104, a plurality of comfort devices 106 (e.g., a thermostat device 106a that controls the heating and/or cooling apparatus for the building, other comfort devices such as a fan 106b and window shades 106c), a plurality of sensor devices 107a-107z (collectively, 107), and a client computing device 108. The server computing device 102 receives data from external sources (e.g., weather data, thermostat data from thermostat 106a, sensor data from sensors 107) and determines energy response characteristics and energy requirements for a particular building. The server computing device 102 determines energy control points for the building, and transmits the energy control points to comfort devices 106 in the building (e.g., thermostat 106a, fan 106b, window shades 106c) via the network 104 so that the comfort devices 106 can adjust their settings in order to impact the comfort conditions (e.g., heating/cooling, humidity, airflow, etc.) of the building appropriately. Energy control points can be settings that affect the operation of the comfort devices, such as temperature set points and scheduling for a thermostat 106a, settings for fans 106b and window shades 106c, and the like. The server computing device 102 also interfaces with a client computing device 108 via the network 104 to provide a portal (e.g., a web browser interface) through which a user can view the energy response characteristics and energy requirements for a building (e.g., the user's house). The user can also, for example, manually adjust the energy control points for the thermostat 106a and other comfort devices such as fans 106b and window shades 106c, view temperature profiles and related environmental conditions for the sensors 107, and set up a comfort profile with the user's preferences so the server computing device 102 can automatically adjust the comfort devices 106 based on the comfort profile. It should be appreciated that although FIG. 1 depicts certain examples of comfort devices 106a-106c, other types of comfort devices can be included in the system 100 without departing from the scope of invention.

Figure 2:
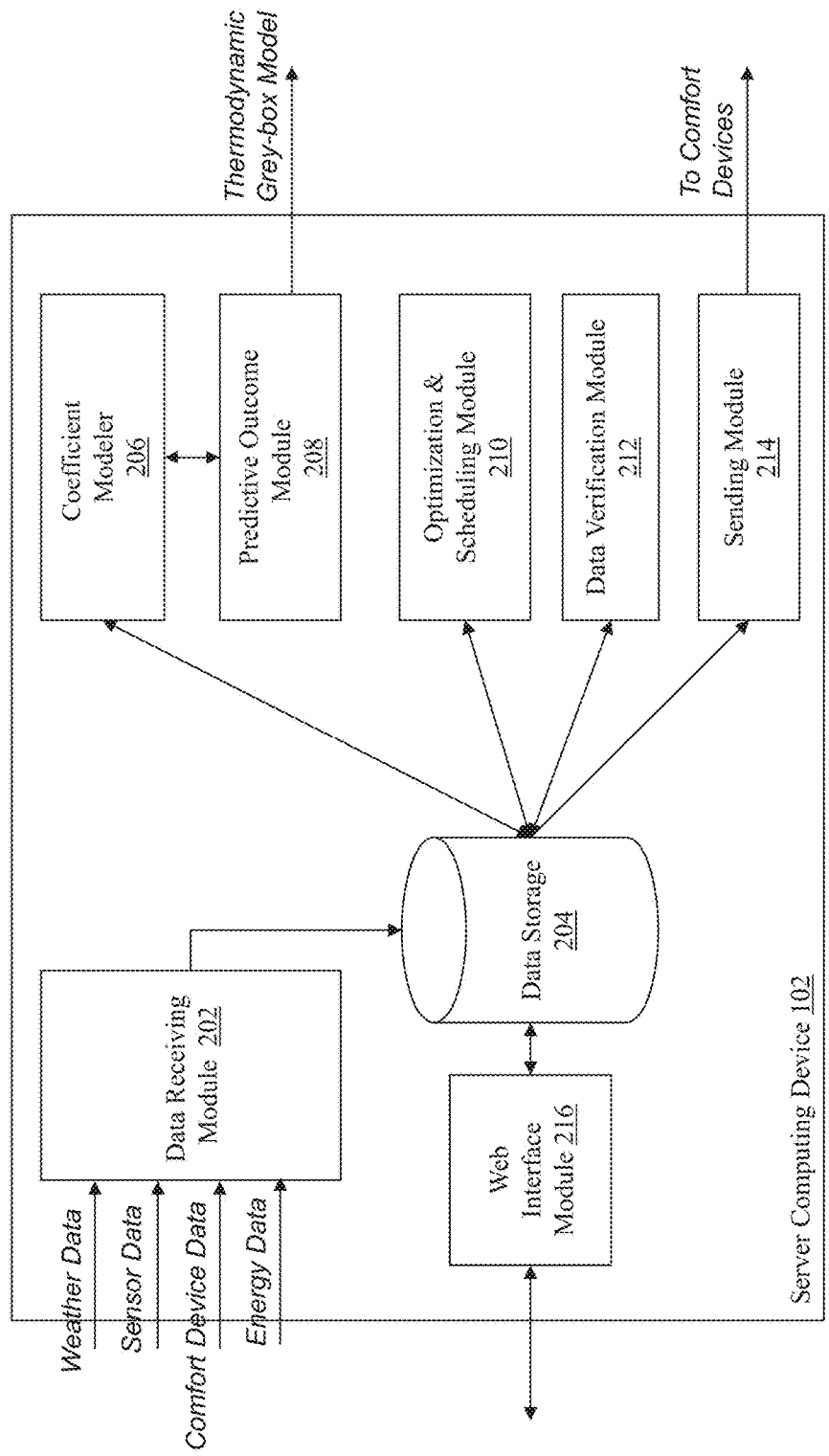
FIG. 2 is a detailed block diagram of a server computing device for optimizing and controlling the energy consumption of a building.

FIG. 2 is a detailed block diagram of the server computing device 102 for optimizing and controlling the energy consumption of a building. The server computing device 102 includes a data receiving module 202, a data storage 204, a coefficient modeler 206, a predictive outcome module 208, an optimization and scheduling module 210, a data verification module 212, a sending module 214, and a web interface module 216. It should be appreciated that, although FIG. 2 shows the components (e.g., 202, 204, 206, 208, 210, 212, 214 and 216) as within a single server computing device 102, in some embodiments the components are distributed on different physical devices without departing from the spirit or scope of the invention. Also, in embodiments where the components are distributed on different physical devices, those devices can reside at the same physical location or may be dispersed to different physical locations.

The data receiving module 202 provides an interface between external data sources (e.g., weather databases, energy providers, comfort devices 106, and sensors 107) and the data storage 204 of the server computing device 102. The data receiving module 202 receives data associated with atmospheric conditions and weather from various external data collection and/or monitoring systems (e.g., NWS, NOAA, Earth Networks Weather Network). Other sources of information include, but are not limited to, governmental agencies and third-party private companies. The atmospheric conditions and weather data can include, but is not limited to, current conditions information, forecast information and weather alert information. The atmospheric conditions and weather data can be categorized by location (e.g., zip code or GPS coordinates). The data receiving module 202 communicates with the various external data systems and sources via standard communications networks and methods.

The data receiving module 202 also receives information from comfort devices 106 that are located within buildings and whose operation impacts the comfort characteristics of the building. As can be appreciated, a primary goal of a building's HVAC system is to control the thermal comfort of an indoor environment. Generally, thermal comfort can be defined as the condition of mind that expresses satisfaction with the thermal environment. Many factors can influence thermal comfort, such as metabolic rate, clothing insulation, air temperature, mean radiant temperature, air speed, relative humidity, and a subject's personal preferences. Therefore, the ability to receive information from and to control comfort devices such as thermostats operating HVAC systems, fans, doors, windows, heaters, vents, shades and the like is important in optimizing and controlling the energy consumption of a building.

For example, the thermostat 106a transmits characteristics about its current operation status (e.g., current temperature setting, heating mode, cooling mode, power settings, efficiency conditions) to the server computing device 102. In another example, comfort devices such as fans 106b and shades 106c transmit operational settings (e.g., on/off, open/closed, speed) to the server computing device 102. In some embodiments, the data receiving module 202 also gathers information from a smart meter (e.g., electric meter, gas meter, or water meter) located at the building. The smart meter is configured to record consumption of energy in predetermined intervals (e.g., one hour), and communicate the recorded information to the utility that provides service to the building. In some embodiments, the data receiving module 202 also gathers information from devices at the building that control alternative sources of energy supplied to the building, such as solar panels, wind power, generators and so forth. The data receiving module 202 can receive the recorded consumption information and correlate the energy usage with other types of data (e.g., thermostat data, exterior weather data) to determine how changes in outside weather conditions and adjustment of the comfort devices' 106 settings impact energy consumption. It should be appreciated from the foregoing that a building may have multiple thermostats and/or multiple heating and cooling zones, and that the system 200 described herein can conduct the energy optimization and control process described herein for a plurality of comfort devices within the same building.

The data receiving module 202 also receives information from additional devices (e.g., sensors 107) that can be positioned at various locations within a building. For example, each room in a building may be equipped with a sensor to provide a measurement of the temperature in the specific room—which may or may not contain a thermostat. The temperature readings provided by the sensor can be compared against the reading(s) obtained from the thermostat to determine whether the temperature in a specific location (e.g., a room) within a building is diverging from the thermostat and potentially not responding to actions taken by the thermostat to change the temperature of the building. For example, if the thermostat initiates an action to heat the building and records a corresponding increase in temperature in the location of the thermostat but the sensor in another room does not record an increase in temperature, the other room may not be heating properly due to structural defects (e.g., leaky doors/windows) or problems with the heating/cooling system in the room.

In addition, the sensors can comprise a combination sensor, that is a temperature sensor combined with other types of sensors or devices that may be found in a building, such as a door status sensor, a window status sensor, a shades status sensor, an appliance status sensor, or a motion detection sensor. The data receiving module 202 can receive multiple types of information from the combined sensors that are useful in determining and optimizing the temperature, comfort, and energy usage of the building. For example, a combined temperature and motion sensor can provide information relating to the temperature and movement or activity in a particular room within a building. If the temperature and motion sensor does not detect any activity in the room between the hours of 8:00 am and 5:30 pm (e.g., no one is using the room) but the temperature in the room shows a change based upon a heating or cooling action initiated by the building thermostat during those times, it may be a waste of energy to heat or cool the room because the room is not being occupied. Therefore, the system can determine adjustments to the heating or cooling profile at the thermostat in order to conserve energy during that time period.

In another example, a combined door open/close and temperature sensor can provide information relating to the temperature at a door as well as the state of the door (e.g., open, closed). In this example, if the sensor indicates that the door is closed but the temperature reading at the door is significantly different than the temperature in another part of the room or building, it may suggest that the door is leaky, damaged, or not properly insulating. Therefore, the system can generate a temperature profile for the door, include this variable in the overall energy optimization process, and provide a report or alert highlighting the temperature discrepancy. Alternatively, if the sensor indicates that the door is open and the temperature reading at the door is significantly different, the system can account for the state of the door when conducting the energy optimization process described herein.

In another example, a combined appliance and temperature sensor can provide information relating to the temperature in proximity to an appliance as well as operating characteristics or conditions of the appliance. In this example, the sensor can indicate that a temperature around a stove is higher than in other areas of the room and/or building and also indicates that the stove is on during those times. Therefore, the system can account for the temperature variation and make adjustments to the energy optimization profile and thermostat control process as needed. It should be appreciated that the sensors 107 can measure other types of information in addition to or instead of temperature, such as humidity, radiant heat, sunlight, air flow/speed, and the like.

The data receiving module 202 consolidates and aggregates the received information into a format conducive for storage in the data storage 204 and processing by the modules 206, 208, 210, 212, 214 and 216. For example, each data source to which the data receiving module 202 is connected may transmit data using a different syntax and/or data structure. The data receiving module 202 parses the incoming data according to an understanding of the source of the data and reformat the data so that it conforms to a syntax or structure acceptable to the data storage 204 and the modules 206, 208, 210, 212, 214 and 216. In some embodiments, the external data sources transmit the information in a standard format (e.g., XML) to reduce the processing required of the data receiving module 202.

The data receiving module 202 communicates with the data storage 204 to save and retrieve data received from external sources in preparation for transmitting the data to the modules 206, 208, 210, 212, 214 and 216. In some embodiments, the data receiving module 202 transmits a notification to the coefficient modeler 206 that the data has been stored in the data storage 204 and is ready for processing by the coefficient modeler 206. The notification includes a reference indicator (e.g., a database address) of the storage location of the data within the data storage 204.

The data storage 204 is a database or other similar data structure, including hardware (e.g., disk drives), software (e.g., database management programming) or both, that stores information received by the data receiving module 202. The data storage 204 also provides data to the modules 206, 208, 210, 212, 214 and 216, and receives updated data and analysis from the modules 206, 208, 210, 212, 214 and 216.

The coefficient modeler 206 is a module that retrieves information from the data storage 208 and generates sets of thermal response coefficients associated with energy characteristics of a building. The modeler 206 determines the location of the building (e.g., by retrieving the building's zip code or GPS coordinates). In some embodiments, the modeler 206 retrieves additional data associated with the building, such as physical structure of the building (e.g., construction materials), solar orientation and load, thermal mass, and wind infiltration. In some embodiments, the modeler 206 infers the physical structure of the building, solar orientation and load, thermal mass, and/or wind infiltration based on the location of the building. In some embodiments, the modeler 206 retrieves smart meter data associated with the building that has been collected by the server computing device 102 from a smart meter installed at the building. In some embodiments, the modeler 206 extracts data from the data storage 204 in the form of a comma-separated value (.csv) file.

Based on this information, the modeler 206 determines a thermal profile for the building. Using the thermal profile in conjunction with the weather information for the location of the building, the current thermostat setting for the building, and other data associated with the building (e.g., smart meter data, sensor data from sensors 107), the modeler 206 generates sets of thermal response coefficients based on the various characteristics that affect the comfort of the building (e.g., temperature, humidity, thermal mass, solar loading, and wind infiltration) and the amount of energy consumed by the heating/cooling apparatus and other comfort devices at the building. Each set of thermal response coefficients can be different, according to projections of the weather conditions at the location over a period of time (e.g., an hour, a day). The modeler 206 ranks the sets of thermal response coefficients based on considerations of energy usage, forecast accuracy, occupant preferences, and the like. The modeler 206 transmits the ranked thermal response coefficients to the data storage 204 for use by other modules 208, 210, 212, 214, 216 of the system 100.

The optimizing and scheduling module 210 retrieves the ranked thermal response coefficients from the data storage 204 along with additional information, such as the weather forecast associated with the location of the building and an occupant preference profile associated with the building. In some embodiments, the optimizing and scheduling module 210 also retrieves current and estimated energy prices (e.g., from the data storage 204 or from an external data source such as a utility company). The optimizing and scheduling module 210 transmits the information to the predictive outcome module 208.

The predictive outcome module 208 generates a series of energy control points for the comfort devices 106 in the building, based on the current and forecast weather conditions for that location and each set of thermal response coefficients. The predictive outcome module 208 also generates a power usage estimate, duty cycle, and indoor temperature forecast for the heating/cooling apparatus installed the building based on the series of energy control points. In some embodiments, the predictive outcome module 208 can also generate an estimated energy cost associated with the series of energy control points by incorporating current energy prices into the determination.

The optimizing and scheduling module 210 receives the series of energy control points from the predictive outcome module 208 and optimizes the results based on additional factors such as anticipated demand response events and/or occupant preferences. For example, if the weather forecast indicates that the exterior temperature will rise from 70° F. at 8:30 am to 90° F. at 11:00 am, the optimizing and scheduling module 210 determines that there will be an increased demand for energy to power air conditioning systems at that time. The optimizing and scheduling module 210 also determines that the price of energy will go up at that time. As a result, the optimizing and scheduling module 210 adjusts the series of energy control points to provide additional cooling (i.e., pre-cool) to the home in the earlier part of the morning (e.g., 8:30 am) so that the air conditioner in the home does not need to run as long at 11:00 am when the exterior temperature is hotter. For example, the optimizing and scheduling module 210 can transmit energy control points to fan 106b that instruct the fan to switch to a higher speed during the pre-cool phase, then switch to a lower speed or turn off during other parts of the day.

Also, the optimizing and scheduling module 210 understands that the price of energy at 8:30 am is lower than the predicted cost at 11:00 am, so an increased consumption of energy in the early morning achieves a cost savings versus consuming more energy at the later time of 11:00 am. In some cases, the optimizing and scheduling module 210 can adjust the energy control points based upon temperature readings and comfort characteristics received from the sensors 107 inside the building, as described previously.

Once the optimizing and scheduling module 210 has adjusted the series of energy control points, the module 210 transmits the series of energy control points to the data storage 204. The data storage 204 transmits the series of energy control points to the sending module 214, which communicates the energy control points to the comfort devices 106 in the building. In one example, the energy control points include temperature set points that provide a schedule of target temperatures for the thermostat 106a for a given time period (e.g., one day). The thermostat 106a can perform heating and/or cooling according to the schedule of temperature set points to achieve increased energy efficiency and anticipation of demand response events.

The server computing device 102 also includes a data verification module 212. The data verification module 212 retrieves energy usage data for the building from a prior time period and compares the usage data to what was predicted by the system 100 for the same time period. For example, the data verification module 212 retrieves the energy usage data (e.g., as provided by a smart meter, a solar panel module, or from a utility) for a customer's home on a particular day. The data verification module 212 also retrieves the predicted energy usage for the same day, based on the determinations performed by the modeler 206, predictive outcome module 208 and optimization and scheduling module 210. The data verification module 212 compares the two energy usage values (actual vs. predicted) to determine if any deviations occurred. Based on the comparison, the data verification module 212 can provide energy usage savings data that can be presented to the customer (e.g., via the web interface module 216). In some embodiments, the data verification module 212 determines energy savings using additional methodologies. For example, the data verification module 212 can compare a building's energy usage between (i) a day where the optimization and scheduling module 210 did not adjust the temperature set point schedule for the building's thermostat and (ii) a day where the optimization and scheduling module 210 did adjust the temperature set point schedule. The data verification module 212 can produce charts and other reports showing the energy savings achieved when the optimization and scheduling module 210 is run. In addition, the comparison information generated by the data verification module 212 is used to refine the coefficient models created by the modeler 206 to achieve greater accuracy and better efficiency.

The server computing device 102 also includes a web interface module 216. The web interface module 216 is configured to receive connection requests from client devices (e.g., client device 108 in FIG. 1) and provide a portal for the client devices to access and update the thermal profile information associated with a building. For example, a homeowner can register with the system 100 and connect to the web interface module 216 via a web browser on a client device 108. Upon logging in, the homeowner is presented with a portal containing various information related to the current energy characteristics of his home, as well as interactive features that allow the homeowner to establish and change comfort preferences for the internal temperature of his home. In some embodiments, the portal includes a home energy audit function which leverages the data stored in the system 100 (e.g., thermal profile, energy usage, weather conditions, data from sensors 107 throughout the home) and compares the homeowner's dwelling with other buildings that share similar thermal comfort and/or energy consumption characteristics. The homeowner can determine the relative energy usage of his home against other homes or buildings in his area. Based on the home energy audit, the portal can also provide a customized and prioritized list of suggestions for improving the energy efficiency of the building.

Figure 3:
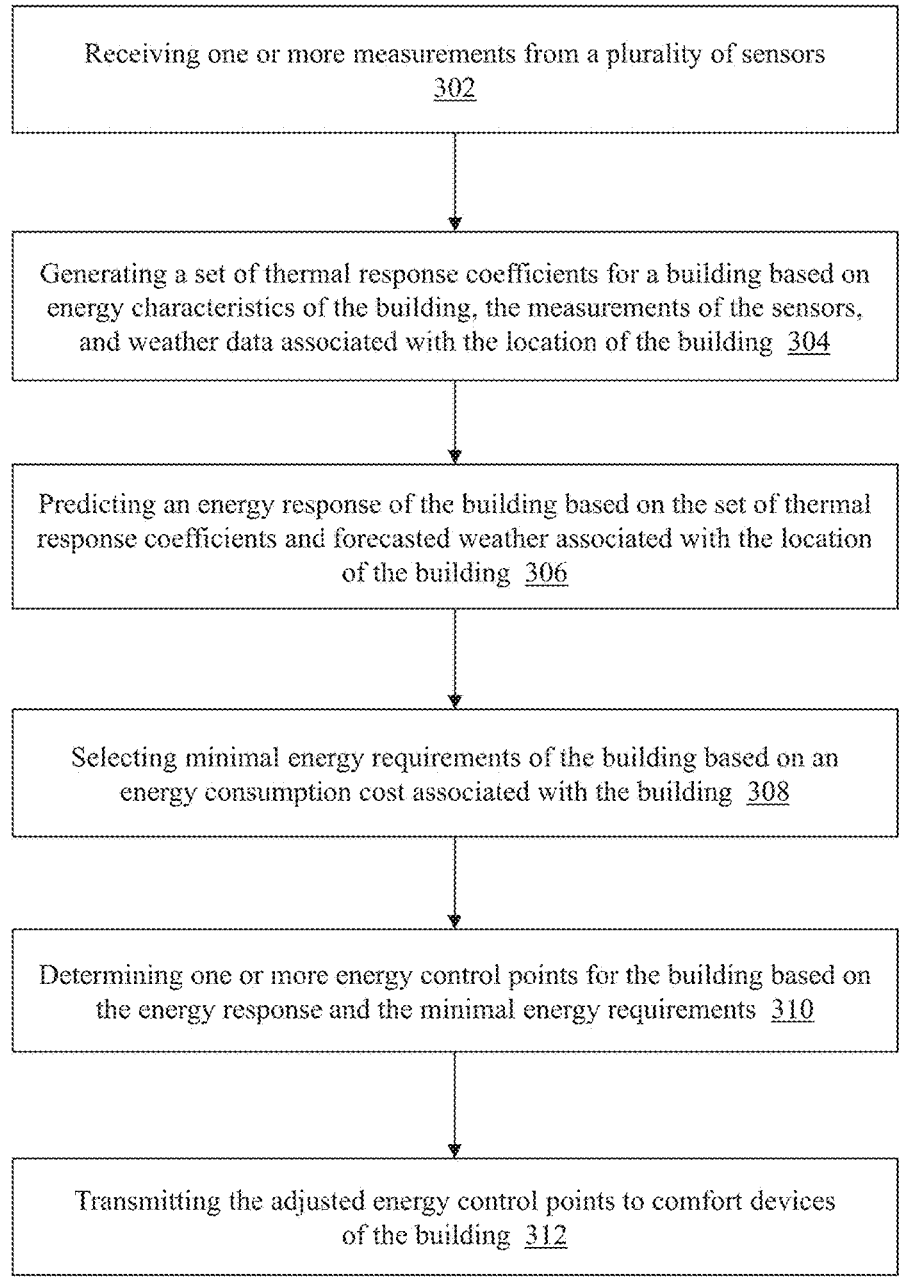
FIG. 3 is a flow diagram of a method for optimizing and controlling the energy consumption of a building.

FIG. 3 is a flow diagram of a method 300 for optimizing and controlling the energy consumption of a building. The server computing device 102, using the data receiving module, receives (302) one or more measurements from a plurality of sensors, at least some of which are located inside the building, where the measurements include temperature readings and comfort characteristics as described above. The server computing device 102, using the coefficient modeler 206, generates (304) a set of thermal response coefficients for a building based on energy characteristics of the building, measurements obtained from the sensors 107, and weather data associated with the location of the building. The server computing device 102, using the optimization and scheduling module 210 and the predictive outcome module 208, predicts (306) an energy response of the building based on the set of thermal response coefficients and forecasted weather conditions associated with the location of the building.

The server computing device 102, using the optimization and scheduling module 210 and the predictive outcome module 208, selects (308) minimal energy requirements of the building based on an energy consumption cost associated with the building. The server computing device 102, using the optimization and scheduling module 210 and the predictive outcome module 208, determines (310) one or more energy control points for the building based on the energy response and the minimal energy requirements.

The server computing device 102, using the data verification module 212, compares the previous day's energy usage for the building against the predicted energy usage provided by the modeler 206 and the predictive outcome module 208 to determine energy usage deviations and potential energy savings. The server computing device 102, using the sending module 214, transmits (312) the adjusted energy control points to comfort devices 106 of the building.

In some embodiments, the techniques described herein are used to execute demand response events in conjunction with local or regional utilities and service providers. The predictive modeling and comfort device control features of the system 100 can be leveraged to prepare for potential demand response events identified by the utilities, and shift energy consumption by buildings connected to the system from peak demand times to lower demand times—thereby reducing the energy demand load on the utilities and potentially providing energy to the buildings at a lower cost.

For example, based on the predictive modeling, energy control point generation, and associated analysis, the server computing device 102 determines that a certain amount of energy will be consumed by buildings connected to the system 100 over the course of the following day. The server computing device 102 also determines that, based on weather forecast information, there may be a peak demand event for energy during a two-hour window the following day (e.g., due to forecast low/high external temperatures or a forecast change in external temperature). Because the server computing device 102 has identified an amount of energy that will be potentially used during that two-hour window, the server computing device 102 can proactively adjust the energy control points for some or all of the comfort devices 106 (e.g., thermostat 106a, fan 106b, shades 106c) to reduce or eliminate consumption of energy and to optimize the comfort characteristics of the building during the peak demand time.

Often, a utility does not have advance warning of a potential demand response event. For example, the utility may not anticipate a demand response event until one hour before the event begins. At the point when the utility becomes aware of the demand response event, the utility can inform the server computing device 102 of the upcoming event. Based on its previous analysis, the server computing device 102 can commit a particular amount of energy to the utility that will not be consumed by buildings of the system 100 during the demand response event. If the utility notifies the system 100 that the utility requires the committed amount of energy, the server computing device 102 automatically transmits adjusted energy control point schedules to the connected comfort devices 106 that reduce energy consumption by the amount of energy committed to the utility.

The server computing device 102 can also adjust the energy control point schedules of the comfort devices 106 to account for the reduced energy consumption while approximately maintaining the comfort characteristics (e.g., temperature, humidity, and the like) desired by the occupant and/or specified in the schedule. For example, if the server computing device 102 understands that the comfort devices 106 will be adjusted to consume no energy during a demand response event (e.g., mid-afternoon on a summer day), the server computing device 102 can adjust the energy control point schedule for the comfort devices 106 (e.g., the temperature set point schedule for thermostat 106a) to pre-cool the building in advance of the demand response event so that the temperature of the building is at or near the originally-scheduled value during the event. The additional energy consumed by the pre-cooling does not occur during the demand response event—leading to reduced load on the utility and potential cost savings for the occupant. Plus, the building approximately maintains desired/scheduled comfort characteristics during the event.

Several mathematical algorithms can be used in developing possible predictions of the energy consumed by buildings connected to the system 100, as well as predicting the specific amount of energy devoted to the operation of HVAC.

Building Energy Model Predictions

In one embodiment, a building is represented as a grey-box system balancing the sensible energy of the entire indoor environment with the flow of energy through the envelope. This type of modeling accounts for heat diffusion through the walls, convection on the inner and outer walls, solar irradiance, infiltration, thermal mass, and HVAC system performance. HVAC status data is obtained from internet connected thermostats, and electricity data from smart meters.

Transient temperatures within the wall are accounted for by solving for the temperatures at nodes within a uniform property wall using an explicit tridiagonal matrix algorithm. Inputs to the model include outdoor temperature, solar insolation, and wind speed data from local weather stations, indoor air temperature, and HVAC status data from internet connected thermostats, and electricity data from smart meters. Instead of requiring detailed measurements of building characteristics such as insulation R-values and fenestration ratios, effective parameter values are calculated from the data.

The exemplary solution technique consists of using a Genetic Algorithm to obtain a least squares curve that fits the modeled indoor air temperatures to the measured temperatures. The parameters are updated periodically to account for changes in the weather and building status. Energy forecasts are made by running the model with weather forecast data, user thermostat set points, and in the case of demand response events, updated set points to reflect the particular strategy proposed to be deployed. It should be appreciated that techniques other than a Genetic Algorithm can be used within the scope of invention.

HVAC Power Disaggregation

The power required to run standard air conditioners is generally dependent on the outdoor air temperature. Air conditioners utilize a vapor compression cycle and achieve cooling by absorbing heat from the indoor environment in the evaporator and rejecting it outside in the condenser. To get this heat transfer in the condenser, the refrigerant needs to be hotter than the outdoor air. Modern systems then compensate for variable outdoor air temperatures by adjusting the difference in pressure between the evaporator and condenser. When the outdoor temperature rises, this pressure differential (i.e., pressure ratio) needs to increase, requiring more power by the compressor. The same power variability with outdoor temperature is also observed in heat pumps.

This temperature dependence is important for predicting air conditioner load, and can be measured using thermostat and smart meter power data. An exemplary method has been developed that matches the smart meter data with HVAC ON/OFF time periods to determine approximate HVAC ON power spikes. These power spikes are binned by their outdoor air temperature. Then a linear regression of the binned data is used to create an HVAC power curve. This power curve can be used to approximate the load anytime the HVAC is on given outdoor temperature data or forecasts.

Figure 4:
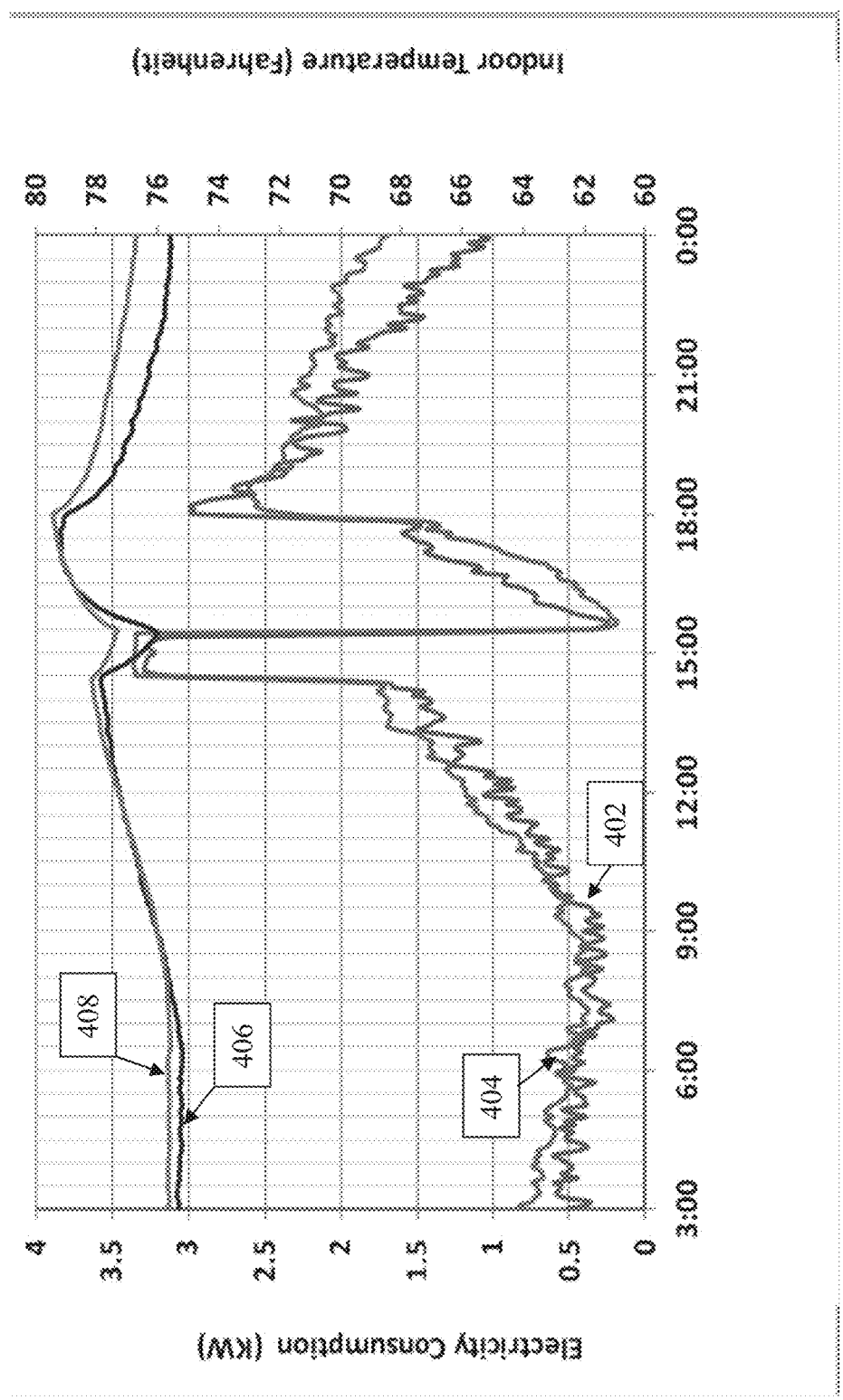
FIG. 4 is a diagram showing power usage and temperature readings as determined by predictions of the system in comparison to actual power usage and temperature readings.

FIG. 4 is a diagram showing power usage and temperature readings as determined by predictions of the system 100 in comparison to actual power usage and temperature readings for an example building over an example time period. In the graph of FIG. 4, line 402 represents the average actual power usage, line 404 represents the average power usage prediction as determined by the system 100, line 406 represents the average actual indoor temperature and line 408 represents the average indoor temperature prediction as determined by the system 100. The data depicted in FIG. 4 was captured during a demand response event. As shown in FIG. 4, the techniques described herein provide accurate predictions of demand response capacity and the impact of demand response on indoor comfort characteristics, such as temperature. The deviations between actual and predicted values for both power (e.g., 402, 404) and indoor temperature (e.g., 406, 408) are small and demonstrate the effectiveness of the system 100 in providing accurate predictions.

Detailed Measurements from Sensors and Related Analysis

Figure 5A:
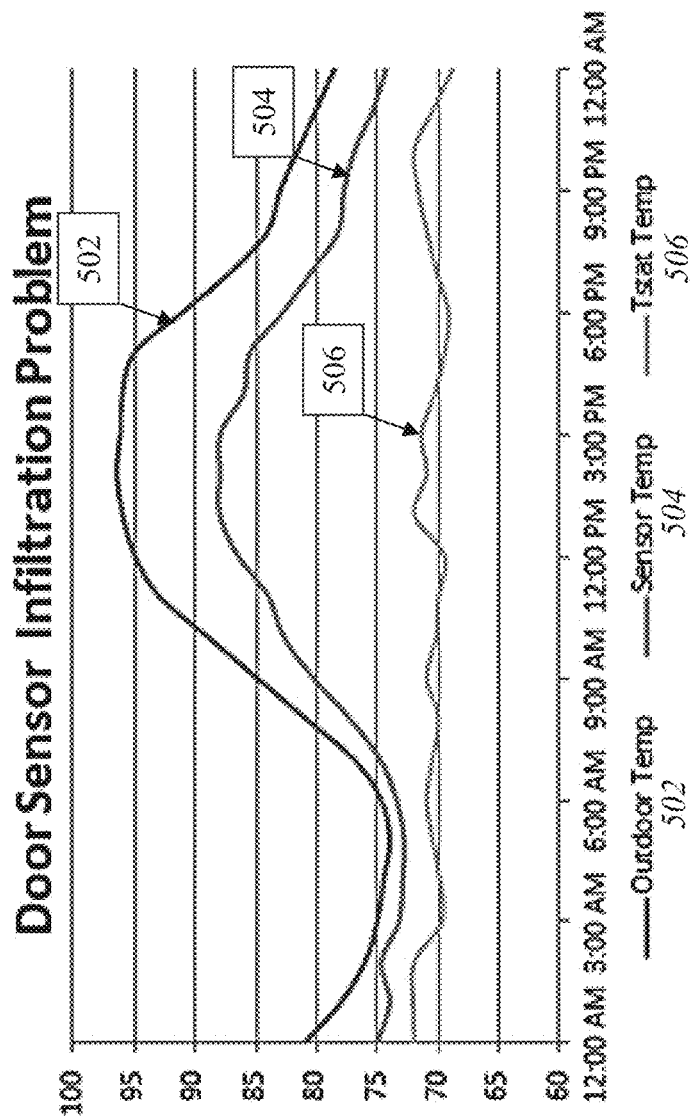
FIGS. 5A-5B are diagrams showing temperature readings of a temperature sensor located in proximity to a door as compared to temperature readings of the building's thermostat and of the outdoor environment over the same time period.
Figure 7:
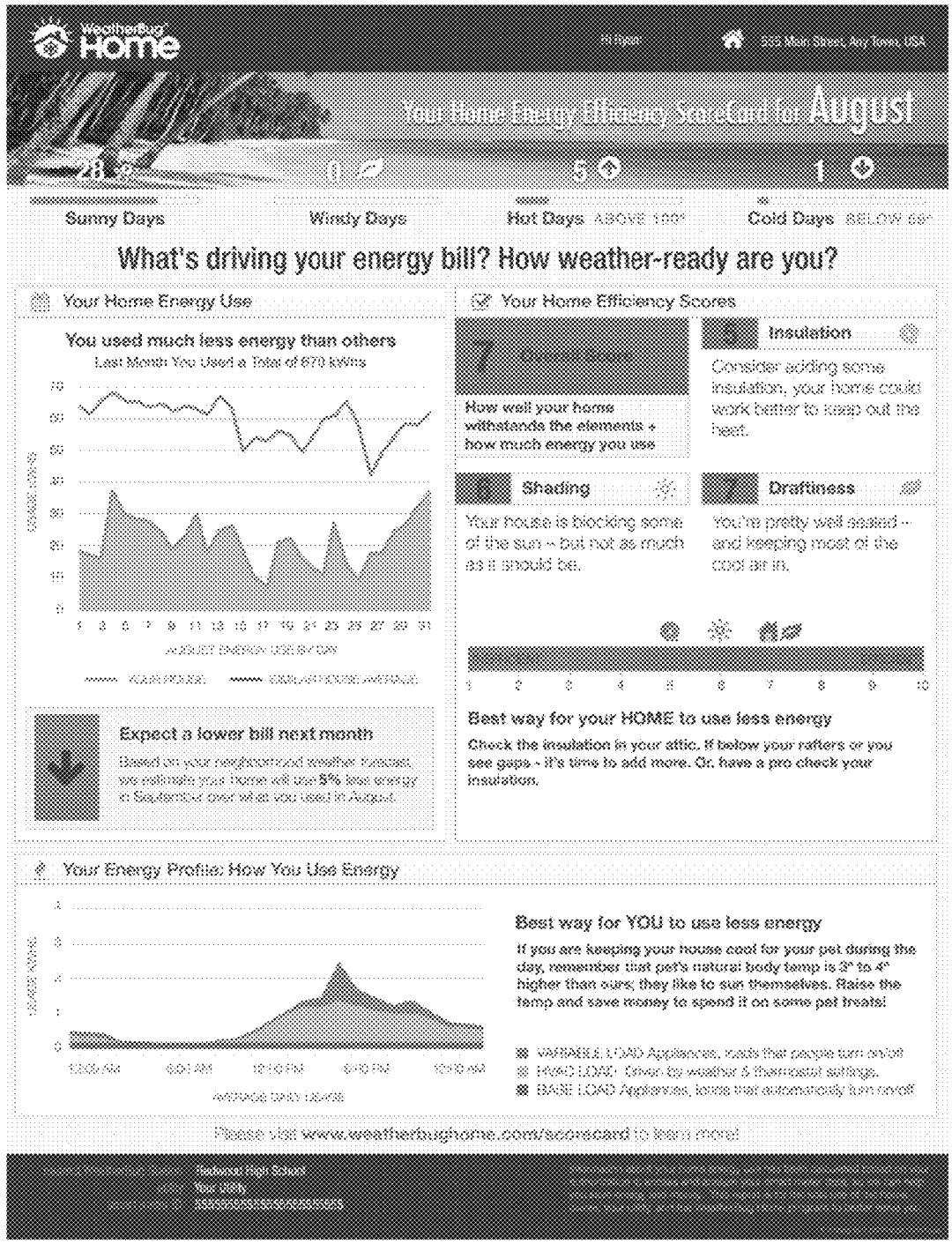
FIG. 7 is an exemplary scorecard showing energy efficiency and energy usage for a building.

As described previously, the sensors 107 of the system 100 of FIG. 1 can provide information that enables the system 100 to provide detailed energy efficiency, comfort analysis, and temperature analysis of specific rooms in a building and/or specific doors or windows. FIG. 5A is a diagram showing temperature readings of a sensor located in proximity to a door as compared to temperature readings of the building's thermostat and of the outdoor environment over the same time period. As shown in FIG. 5A, the door sensor records an increase in temperature 502 (e.g., from 75° at 12:00 am to 88° at 12:00 pm) that corresponds to the temperature increase outside the building 504 during the same time period. However, the thermostat in the building does not record an appreciable temperature change 506 in that time period. This could indicate that the door is experiencing an infiltration problem that causes an overall energy loss in the building. The system 100 can generate a report such as a scorecard including the diagram in FIG. 5A and transmit the report to a user (e.g., homeowner) along with an indication of what action to take to save energy (i.e., seal the door). For example, FIG. 7 is a scorecard showing energy efficiency and energy usage for a building, where the scorecard is generated by the system of FIG. 1 using the analysis described herein.

Figure 5B:
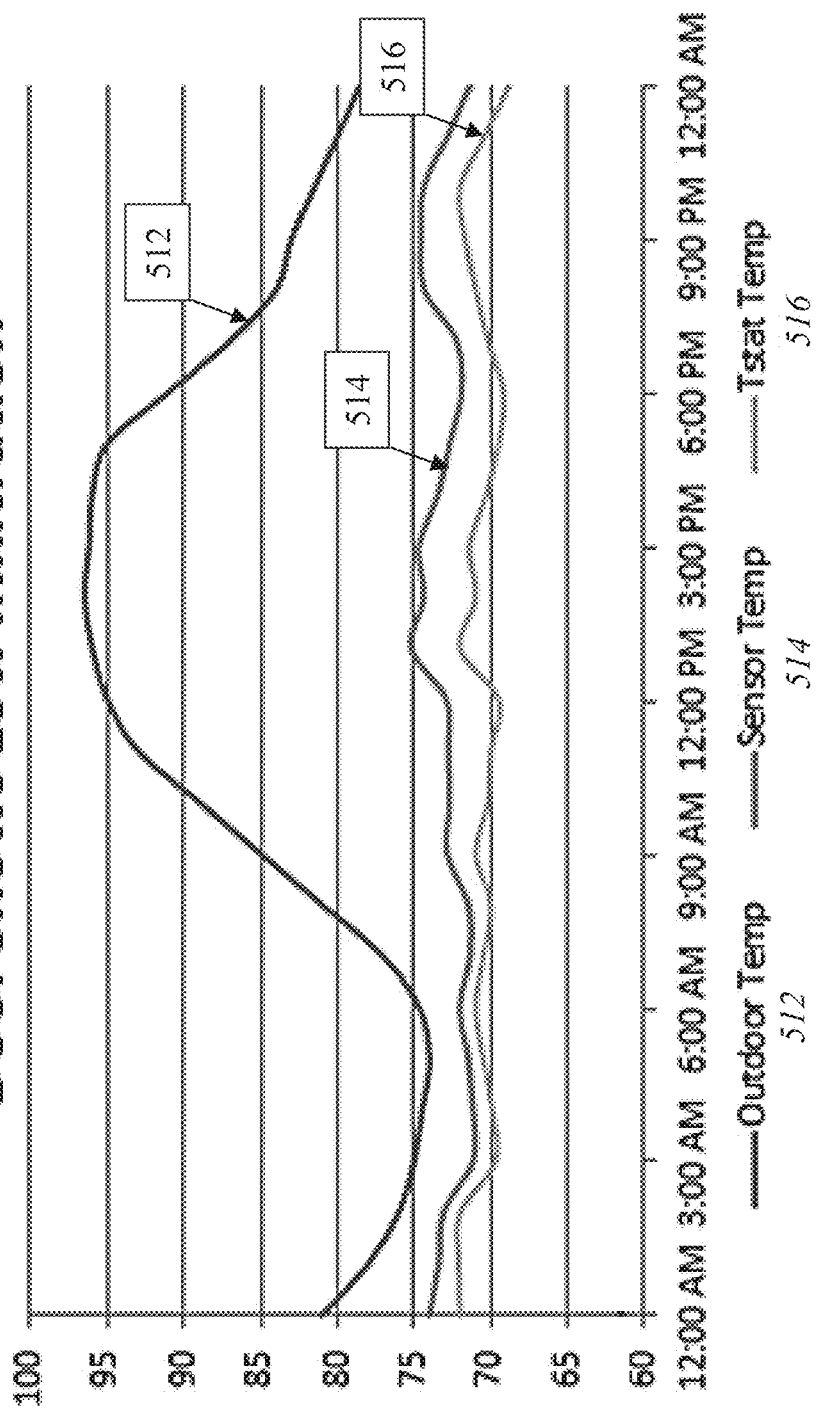

In contrast, FIG. 5B is a diagram showing temperature readings of a sensor located in proximity to a door as compared to temperature readings of the building's thermostat and of the outdoor environment over the same time period, where the temperature readings of the door sensor do not show a temperature increase 514 that corresponds to the temperature change in the outdoor environment 512. Instead, the door temperature remains constant throughout the day, much like the thermostat temperature 516. This indicates that the door is not experiencing an infiltration problem.

Figure 6:
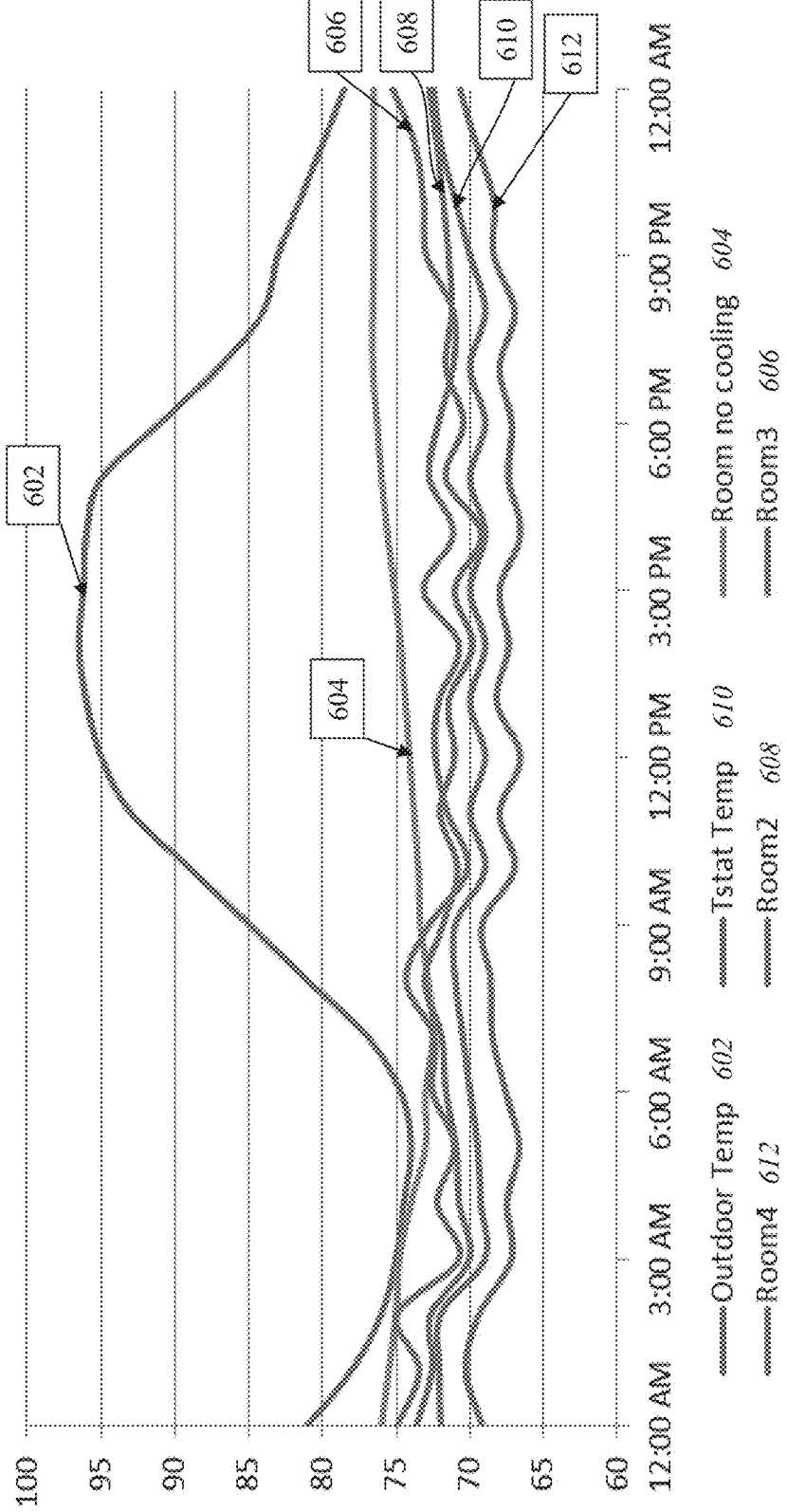
FIG. 6 is a diagram showing temperature readings of temperature sensors located in four different rooms of a building as compared to temperature readings of the building's thermostat and of the outdoor environment over the same time period.

FIG. 6 is a diagram showing temperature readings received from sensors located in four different rooms of a building as compared to temperature readings of the building's thermostat and of the outdoor environment over the same time period, where the temperature readings of one room 604 show an increase in temperature as the outdoor temperature 602 increases—while the temperature of the remaining rooms 604, 608, 612 correspond to the temperature reading of the thermostat 606. This indicates that one room (604) is not receiving the same amount of cooling as the other rooms in the buildings, which might suggest a problem with the cooling equipment in that room.

In another example, the system 100 can adjust the energy control points for a building based upon the location and/or distance of an occupant. For example, a homeowner with a mobile device can instruct the server computing device 102 to begin adjusting the comfort characteristics of his home as the homeowner leaves work for the day. The server computing device 102 can determine that the homeowner typically has a one-hour commute (based upon distance and expected travel time due to traffic, etc.) and the server computing device 102 can generate energy control points for comfort devices 106 in the home to operate so that the home reaches a desired comfort level at approximately the same time that the homeowner arrives there.

Other Types of Energy-Generating Devices

In addition to being connected to a utility such as a power grid, a building may have other types of energy-generating devices installed from which it can draw energy to supply to the cooling/heating system and other comfort devices of the building. Such energy-generating devices include solar panels, generators, and energy storage devices. The system 100 described herein can utilize the energy available from such devices or sources in optimizing the energy consumption of the building as described previously. For example, in a building equipped with solar panels, the system 100 can determine that the building should be cooled a few additional degrees (using energy from the building's solar panels) for a period of time during which weather reports have predicted the sun will be out—because the system 100 has also determined that it will be cloudy and warmer later on in the day and that energy prices will rise during the day as well. The advance cooling instantiated by the system 100 makes use of a cheaper source of energy (solar panels) and takes advantage of the energy optimization and prediction processes described herein.

Application of the Thermodynamic Model to Economic Power Grid Load Shifting

In energy markets, there are potential large savings to be made by shifting the load from periods of high energy prices to those with lower ones. The savings occur because the retail electric provider (REP) can then procure less expensive power to meet the customer's daily demand. This task of how to best shift the load is challenging in that both market prices as well as customer loads are uncertain. This concept of shifting customers' loads is known as demand response (DR), where customers' power consumption is adjusted during certain time periods (also called DR events). Certain optimization models (such as stochastic models) have been developed and implemented in order to maximize expected REP profits and minimize the risk of low profits. A key to the effective implementation of from these models is the home thermodynamic model described above, which serves as the ultimate simulation engine to accurately forecast where the load is going and to figure out what is required to meet the desired load shape for the forecasted market conditions. Allowing for DR events in which participating customers' thermostats can be automatically and optimally controlled is a major step forward in terms of a connected, smart-grid approach to resource management in power markets. The anticipated optimization system for economic-based demand response is a crucial component to more economically efficient matching of energy supply and demand.

Figure 8:
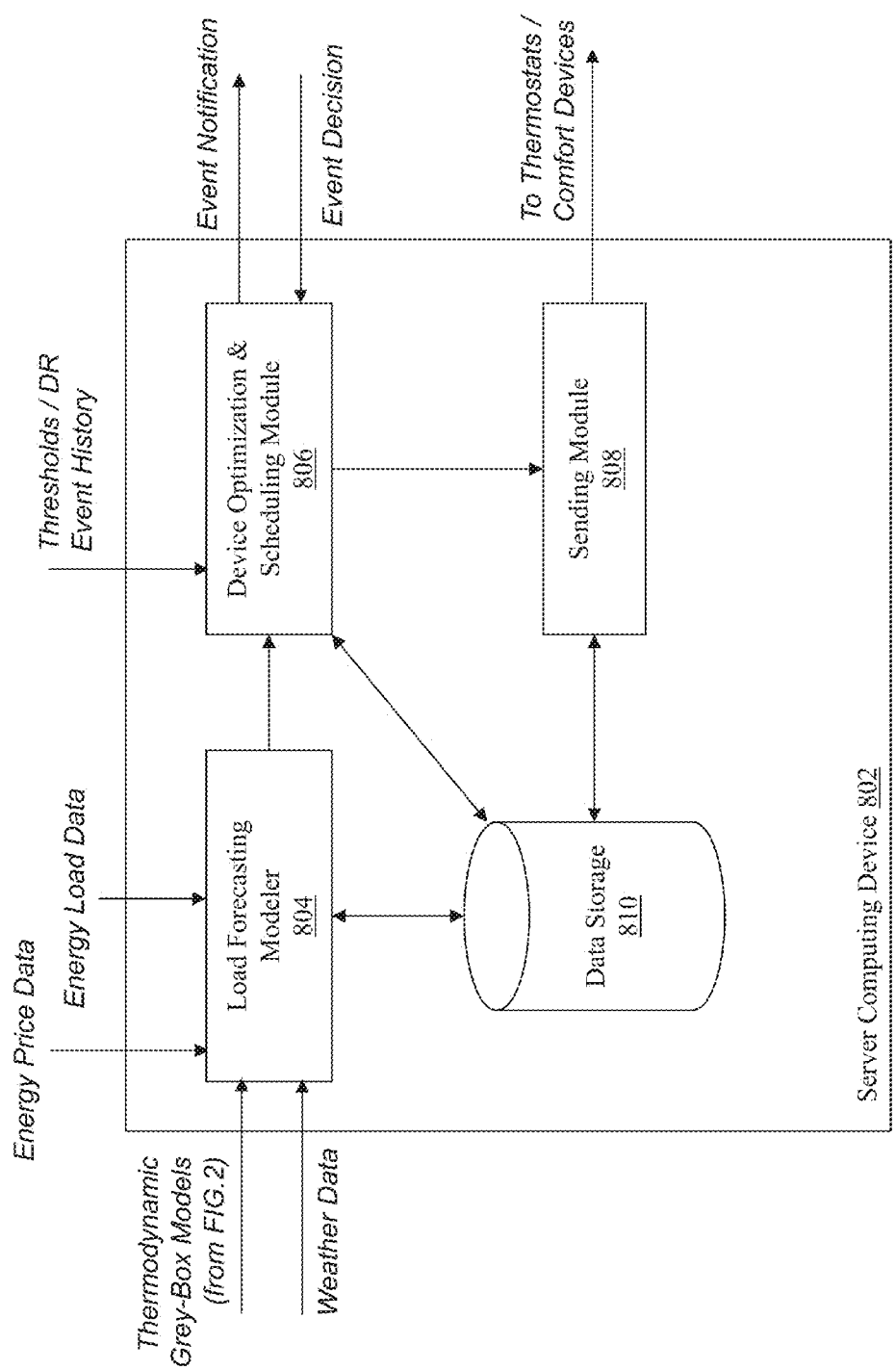
FIG. 8 is a block diagram of a system for determining a load control schedule for a plurality of energy control devices using a load shifting optimization model and applying the load control schedule to adjust the plurality of energy control devices.

FIG. 8 is a block diagram of a system 800 for determining a load control schedule for a plurality of thermostats in one or more buildings using a load shifting optimization model and applying the load control schedule to adjust the plurality of thermostats. The system 800 includes a server computing device 802 with a load forecasting modeler 804, a device optimization and scheduling module 806, a sending module 808, and a data storage module 810. The server computing device 802 is a combination of hardware, including one or more processors and one or more physical memory modules, and specialized software engines that execute on the processor of the server computing device 802 to perform the functions described herein. It should be appreciated that, although FIG. 8 shows the components (e.g., 804, 806, 808, 810) as within a single server computing device 802, in some embodiments the components are distributed on different physical devices without departing from the spirit or scope of the invention. It should also be appreciated that the components 804, 806, 808, 810 can be included in server computing device 102 of FIG. 2 and/or combined with corresponding modules in server computing device 102. Also, in embodiments where the components are distributed on different physical devices, those devices can reside at the same physical location or may be dispersed to different physical locations.

In some embodiments, the components 804, 806, 808 are specialized sets of computer software instructions programmed onto a dedicated processor in the server computing device 802 and can include specifically-designated memory locations and/or registers for executing the specialized computer software instructions. Further explanation of the specific processing performed by the components 804, 806, 808 is provided below.

The load forecasting modeler 804 is a specialized computing module that receives data from other computing systems (and, in some embodiments, from data storage 810), and executes a load forecasting model to determine one or more load/price probability distributions that would result in a preferred set of load-shifting decision rules. In this context, the preferred set of load-shifting decision rules provide better (and in some cases, optimal) profit for REPs while also reducing risk associated with unexpected periods of increased energy prices. The load-shifting decision rules generated by the load forecasting modeler 804 are then used to adjust thermostats and/or comfort devices for homes and other buildings serviced by the REPs in order to accomplish the load-shifting and profit/risk optimization determined by the modeler 804. The load forecasting modeler 804 receives several types of data, including information relating to the thermodynamic grey-box models generated by the system 200 of FIG. 2 (as described above), energy price data (e.g., historical energy price data, per-hour price probability data, real-time price data, and the like), energy load data (e.g., load removed by house/building, historical load data, real-time load data, and the like), weather data (e.g., real-time current conditions, forecast data, and the like) to generate market and REP aggregate forecasts (i.e., sum of individual houses/buildings using their corresponding thermodynamic models). In some embodiments, the modeler 804 also receives other types of data, including the data types received by the data receiving module 202 of FIG. 2. Further details regarding an exemplary modeling technique employed by the modeler 804 will be described later in the specification.

The device optimization and scheduling module 806 receives the determined load/price probability distributions from the load forecasting modeler 804 and converts one or more of the load/price probability distributions into specific load-shifting decision rules and corresponding instructions (e.g., a schedule of setpoints over a particular time period) for each of one or more thermostats and/or comfort devices that, when executed by such devices, achieve the preferred price/risk optimization suggested by the load/price probability distributions from the modeler 804. It should be appreciated that in some embodiments, the functionality of the modeler 804 and the device optimization and scheduling module 806 can be combined into a single module.

The sending module 808 receives the setpoints and related information from the device optimization and scheduling module 806 and transmits the setpoints to each of the thermostats and/or comfort devices (e.g., the devices that are in homes and buildings serviced by the REP). As noted above, the setpoints can comprise a series of control points for operation of the thermostats and/or comfort devices over a period of time. For example, the setpoints may comprise a schedule for automatically adjusting operational settings (e.g., temperature, on/off setting, and the like) for the thermostats and/or comfort devices for, e.g., a day. In adjusting these operational settings, the thermostats and/or comfort devices change the demand for energy during particular times of day (i.e., peak hours, non-peak hours) so as to optimize profit and minimize risk for the REP.

The data storage module 810 is a database or other similar data structure, including hardware (e.g., disk drives), software (e.g., database management programming) or both, that stores information received by the other components 804, 806, 808 of the system 800. The data storage 204 also provides data to the components 804, 806, 808, and receives updated data and analysis from the components 804, 806, 808.

Figure 9:
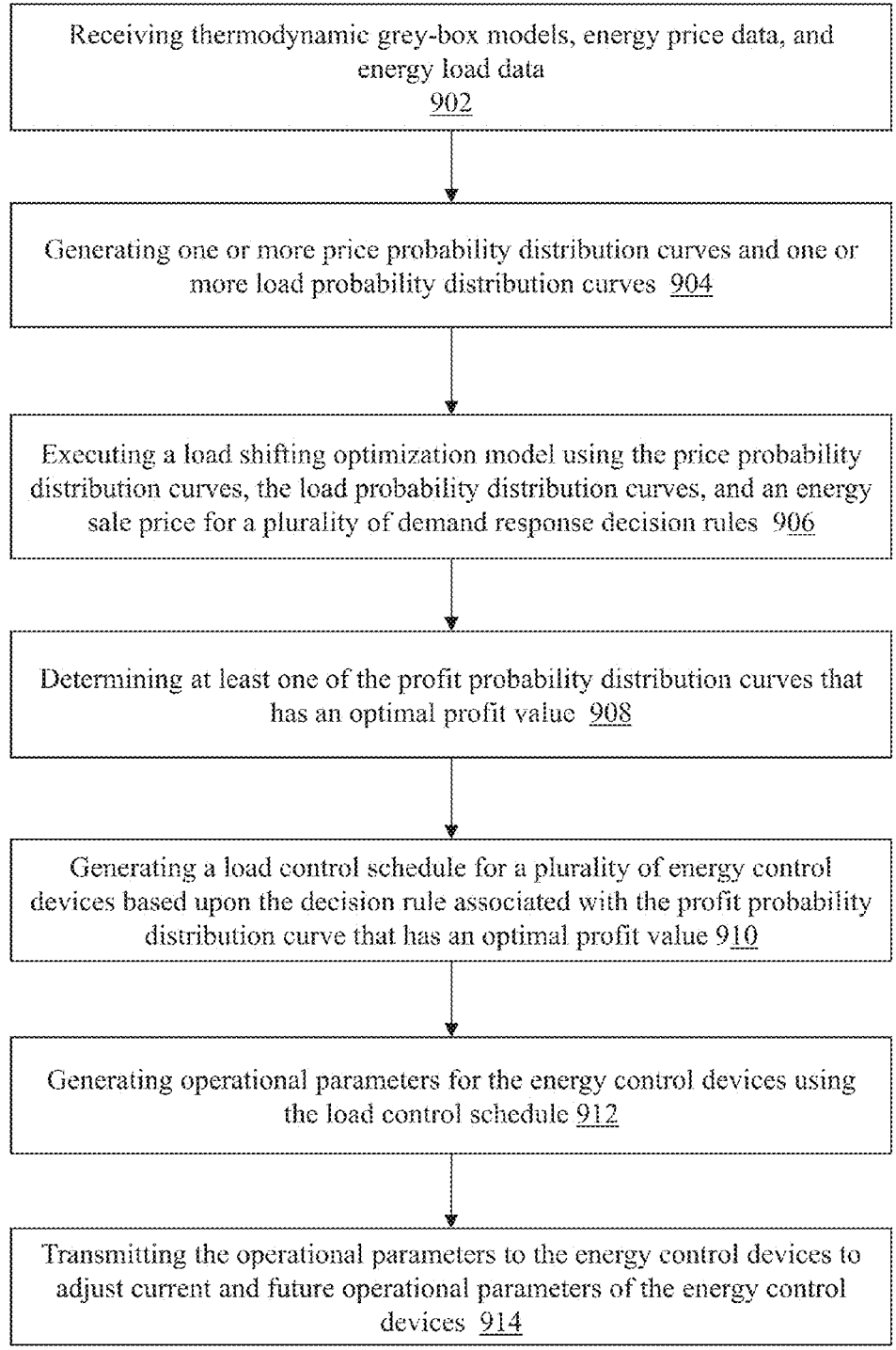
FIG. 9 is a flow diagram of a method for determining a load control schedule for a plurality of energy control devices using a load shifting optimization model and applying the load control schedule to adjust the plurality of energy control devices.
Figure 10:
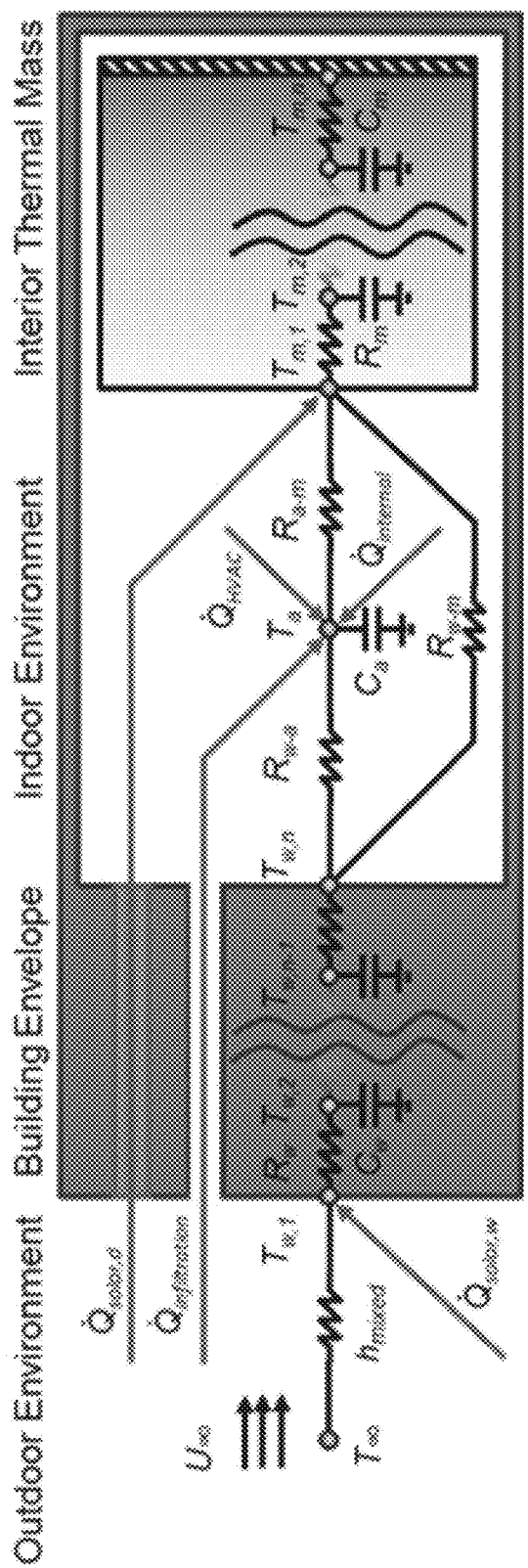
FIG. 10 is an exemplary building heat transfer model using the thermal-electric analogy used in the thermodynamic grey-box model.

FIG. 9 is a flow diagram of a method 900 for determining a load control schedule for a plurality of thermostats using a load shifting optimization model and applying the load control schedule to adjust the plurality of thermostats, using the system 800 of FIG. 8. The load forecasting modeler 804 of server computing device 802 receives (902) data representing thermodynamic grey-box models of one or more buildings serviced by an REP. As mentioned previously, the thermodynamic grey-box models represent complex buildings (that each have unique response to various weather conditions and DR setpoint control strategies) as simple grey-box systems where the sensible energy of the entire indoor environment is balanced with the flow of energy through the envelope. Coefficients representing building parameters are used to non-dimensionalize the heat transfer equations governing this system, each with effective thermal properties. The load forecasting module 804 receives an ensemble of thermodynamic models created with thermal properties for the plurality of thermostats under control. FIG. 10 depicts an exemplary building heat transfer model using the thermal-electric analogy.

In a DR event, the actual load removed for each house is a function of the weather, thermostat setpoints (and their duration of deviation from scheduled), home thermal conditions, and occupant comfort tolerances. To estimate removed and recovery load under a particular DR control strategy, the modeler 804 can simulate the energy response using forecasted and scheduled data.

In addition to the thermodynamic grey-box models, the load forecasting module 804 receives (902) energy price data and energy load data, e.g., from remote computing devices/data feeds provided by third parties, such as the REPs. The energy price data can comprise historical energy price data, such as market settlement data, for particular periods of time (e.g., hours, days, months, etc.). Because the market settlement price may not be known with certainty, the modeler 804 generates (904) price probability distribution curves based upon the energy price data (e.g., hour/month combinations). The energy load data can comprise historical energy load and demand response data for a particular REP and/or buildings serviced by the REP. The modeler 804 generates (904) load probability distribution curves for load and demand response (e.g., for hour/month combinations).

The load modeler 804 executes (906) a load forecasting model using the input data elements (i.e., thermodynamic grey-box model(s), energy price data, energy load data) using the one or more load probability distribution curves and one or more price probability distribution curves, along with an energy sale price, for a plurality of demand response decision rules to generate one or more profit probability distribution curves. In an exemplary embodiment described below, the load modeler 804 employs a specific stochastic optimization technique to generate the one or more profit probability distribution curves and to determine an optimal profit probability distribution curve. It should be appreciated that other types of optimization models (and even different types of stochastic optimization) can be used within the scope of invention described herein.

In one embodiment, the load modeler 804 uses a Monte Carlo simulation technique that simulates load shifting. The load modeler 804 determines an optimal load control schedule based on forecasted load, settlement point prices, and weather variables but taking into account stochastic load and prices. An optimal schedule is defined as the schedule that maximizes the REP's profit and minimizes risk of low profits.

The modeler 804 selects one of a plurality of DR decision rules (or scenarios) to be used in computing the expected profit and conditional value-at-risk (CVaR) (i.e., the measure of the bottom-most profit) based upon the price and load probability distributions. Exemplary DR decision rules are set forth to account for subsequent hours of the forecastable future. These rules contain all the thermostat setpoint changes that can be made within the constraints of the device and customer contract. It should be appreciated that other types of DR decision rules can be implemented with the most flexible decision rule being a smooth load curve. These rules were selected to minimize compute time for the modeling.

The load modeler 804 then creates a vector of N simulated market prices from an appropriate price distribution using the forecasted load to determine what distribution is appropriate. Typically, power prices from one hour to the next should be correlated to some extent given the drivers of these prices (e.g., weather, supply-demand equilibrium). To capture this correlation, the simulated value for the previous hour's price, varying for each simulation sample, is the driver of which price probability distribution to use. For example, if the previous hour's simulated price had a larger probability of being from, e.g., a peak price distribution, then this was the one that was then simulated for the next hour. Conversely, if the previous hour's simulated price had a larger probability of being from e.g., a typical day distribution, it was used. In this way, there is correlation between successive prices that are sampled in the simulation. Also, the modeler 804 can calibrate the hourly price distributions from actual price data which were correlated, and as a result, the successive hourly parameters reflect this.

The load modeler 804 creates a vector of N simulated loads from an appropriate load distribution using the forecasted load.

The load modeler 804 then applies the particular demand response decision rule selected from the available options, and computes a profit for each of the simulated price and load values (given a fixed price to sell the electricity to customers). As noted above, the modeler 804 analyzes all hours of each modeled day. The modeler 804 calculates the profit as:

$$\Sigma_{t=1}^{8} D_t(C-P_t)$$

where Dt is electricity demand for time (hour) t that is simulated from one of a plurality of probability distributions for that time, C is the electricity rate charged to customers independent of time (however, it should be appreciated that customers can be charged a variable rate which is a function of time), and Pt is the settlement point price at time t drawn from one of a plurality of probability distributions for each time t.

Figure 11:
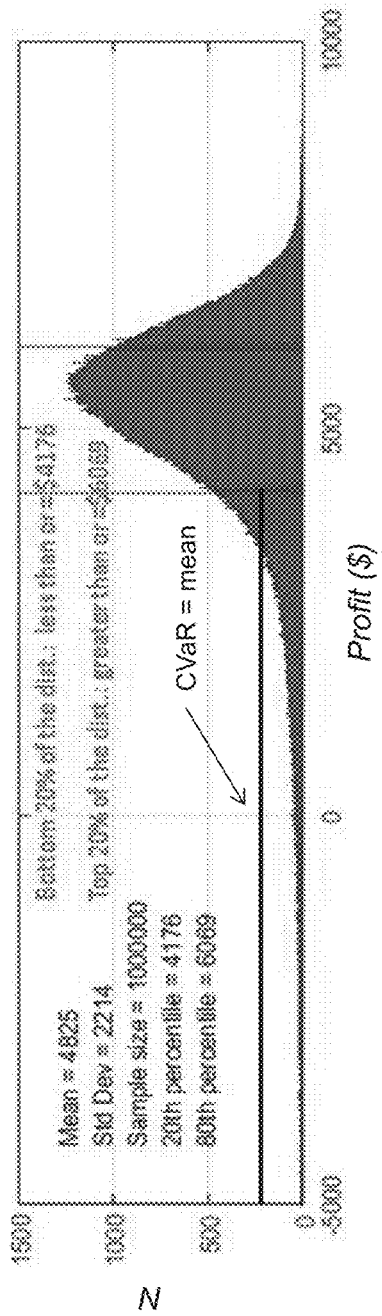
FIG. 11 is an exemplary graph of a base case profit distribution generated by the system.
Figure 12:
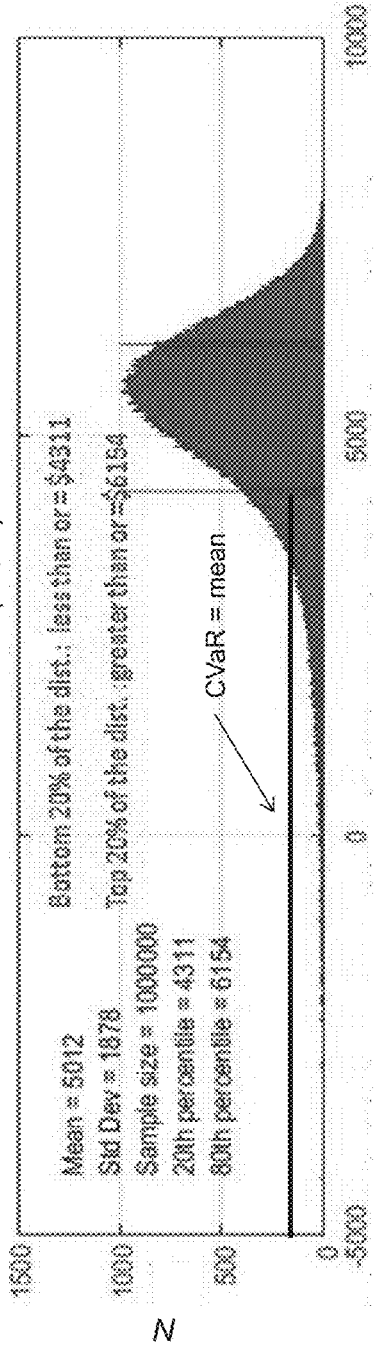
FIG. 12 is an exemplary graph of a best case profit distribution generated by the system.
Figure 13:
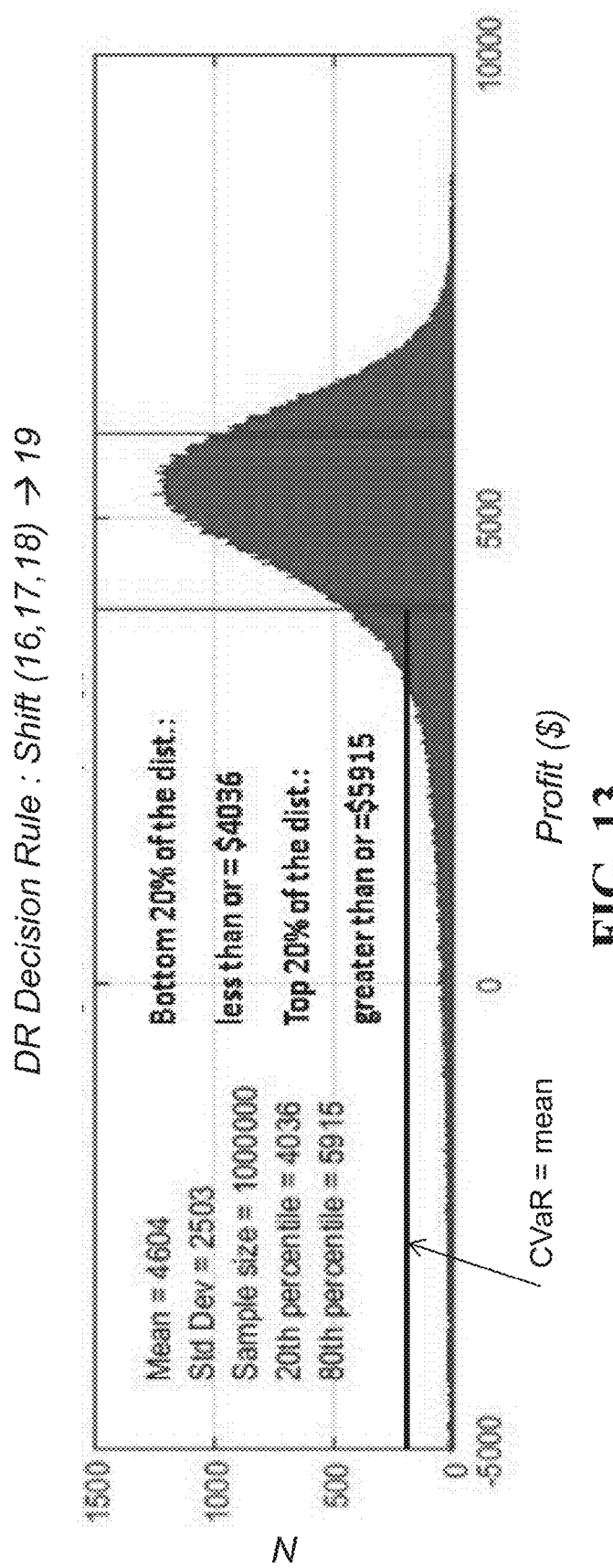
FIG. 13 is an exemplary graph of a worst case profit distribution generated by the system.

The modeler 804 then generates a probability distribution curve for profit, using the computed profit values, and in some embodiments, can determine a base case profit distribution curve (i.e., no load shifting), a best case profit distribution curve, and a worst case profit distribution curve. Each of the best case profit distribution curve and worst case profit distribution curve are associated with at least one of the DR decision rules (as shown in the table above). FIG. 11 is an exemplary graph of a base case profit distribution, FIG. 12 is an exemplary graph of a best case profit distribution, and FIG. 13 is an exemplary graph of a worst case profit distribution.

The difference between the best load-shifting decision rule (as in FIG. 12) and the worst load-shifting decision rule (as in FIG. 13) is mostly in how the left-side of the profit distribution changes. In the best case, the bottom 20% of the profits occurs at about $4311 so there is an 80% chance of profits higher than this value. By contrast, the worst load-shifting rule is significantly further to the left at about $4036; the base case is in the middle. The net effect then of picking the best (or optimal) DR decision rule is to pick the DR decision rule that results in a profit probability distribution curve that minimizes the downside risk (DVaR) of load-shifting and moving the left-hand side tail's probability to the right. The load modeler 804 determines (908) at least one of the profit probability distribution curves that has an optimal profit value and identifies the DR decision rule that resulted in the profit probability distribution curve.

Once the load modeler 804 has determined the optimal profit probability distribution curve and profit value, and the corresponding DR decision rule, the modeler 804 transmits the information to the device optimization and scheduling module 806. The device optimization and scheduling module 806 generates (910) a load control schedule for a plurality of energy control devices (e.g., thermostats, comfort devices, and the like) based upon the DR decision rule associated with the profit probability distribution curve that has an optimal profit value. For example, if the DR decision rule is to shift load from hours ending 14, 15, and 16 to hour 17, then the device optimization and scheduling module 806 generates a load control schedule that results in shifting the load associated with hours 14, 15, and 16 to hour 17 for the groups of houses most efficient at delivering the load. In one example, an actual DR event gets triggered either manually or automatically based upon, e.g., threshold values set by the REP for profit, CVaR, and DVaR at a minimum. Other triggers can be envisioned within the scope of invention, such as forecasted load which exceeds the amount of energy the REP purchased in the day-ahead markets (i.e., so that the REP does not have to buy energy on the spot market, which may be more expensive). The REP can also trigger a DR event based on other pre-defined rules and/or thresholds can be set to notify REPs (and in some embodiments, individual customers for each REP) such that the REPs/customers can manually respond or accept a recommended DR event.

In some embodiments, the REP may provide other data elements, such as maximum number of DR days (i.e., to prevent customer opt-out) and/or maximum number of DR hours. In one example, suppose that the REP set a maximum of five DR events for the summer and four DR events have already been used. It is getting into late August and the long range weather forecast is for cooler days. The REP may still choose to do a DR event and take less profit at the end of the summer knowing that much cooler days are ahead.

The optimization and scheduling module 806 generates (912) operational parameters for the plurality of energy control devices using the load control schedule. For example, the optimization and scheduling module 806 creates operational parameters like current and future temperature setpoint schedules, current and future operational settings (e.g., on/off, power level, etc.) for comfort devices, and so forth.

The sending module 808 receives the operational parameters from the device optimization and scheduling module 806, and transmits (914) the operational parameters to individual thermostats and/or comfort devices coupled to the system 800. Upon receipt, the thermostats and/or comfort devices automatically adjust their operational settings so that the overall energy demand for the buildings serviced by the REP conforms to the optimal profit distribution curve, thereby maximizing the profit for the REP (i.e., enabling the REP to purchase energy it will need during lower cost periods of time) and minimizing the risk for the REP that it will be required to purchase energy during higher cost periods of time.

It should be appreciated that there are at least three benefits of reducing peak load via DR programs. First, there are economic benefits from preferentially purchasing electricity during off-peak times when prices are lower. Second, there are reliability benefits because with lower peak loads, there is less need for a high percentage of system capacity to be online. Third, there are environmental benefits because demand response can decrease the overall amount of electricity used, so there are benefits in terms of conserving resources and reducing greenhouse gas emissions. In addition to these benefits, DR can save electricity consumers billions of dollars per year.

It should be further appreciated that, in addition to thermostats and other energy control devices as described above, the techniques described herein are equally applicable to adjust the operating parameters of many other energy-related and/or energy-consuming devices in a home or building for economic demand response. For example, other large home appliances such as washers, dryers, hot water heaters, and pool pumps that are capable of being controlled remotely or otherwise in communication with remote devices that can provide operating instructions to the devices can be coupled to the system in order to take advantage of the demand response and load shifting principles.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more special-purpose processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for determining a load control schedule for a plurality of energy control devices using a load shifting optimization model and applying the load control schedule to adjust the plurality of energy control devices, the method comprising:

receiving, by a server computing device, one or more thermodynamic grey-box models, wherein each thermodynamic grey-box model is associated with one or more buildings;

receiving, by the server computing device, energy price data associated with a utility provider servicing the one or more buildings and energy load forecast data associated with the one or more buildings;

generating, by the server computing device, one or more price probability distribution curves based upon the energy price data;

generating, by the server computing device, one or more load probability distribution curves based upon the energy load forecast data and the thermodynamic grey-box models;

executing, by the server computing device, a load shifting optimization model using the one or more price probability distribution curves, the one or more load probability distribution curves, and an energy sale price to determine a profit probability distribution curve for each of a plurality of demand response decision rules;

determining, by the server computing device, at least one of the profit probability distribution curves that has an optimal profit value;

generating, by the server computing device, a load control schedule for each of a plurality of energy control devices coupled to the server computing device based upon the profit probability distribution curve that has the optimal profit value;

generating, by the server computing device, one or more operational parameters for each of the plurality of energy control devices using the load control schedule; and transmitting, by the server computing device, the one or more operational parameters to the plurality of energy control devices, wherein the energy control devices adjust one or more of current and future operational parameters based upon the received operational parameters.

2. The method of claim 1, wherein each thermodynamic grey-box model is based upon one or more characteristics of an indoor environment of a building and a flow of energy through an envelope of the building.

3. The method of claim 1, wherein the energy price data is one or more of historical energy price data and per-hour price probability data.

4. The method of claim 1, wherein the energy load forecast data is one or more of historical load data and load forecast probability data.

5. The method of claim 1, wherein the step of executing the load shifting optimization model comprises:
determining, by the server computing device, a demand response decision rule;
generating, by the server computing device, a vector of simulated market prices using at least one of the price probability distribution curves;
generating, by the server computing device, a vector of simulated loads using at least one of the load probability distribution curves;
applying, by the server computing device, the demand response decision rule to the vector of simulated market prices and the vector of simulated loads to generate the profit probability distribution curve for the demand response decision rule; and
determining, by the server computing device, a profit value associated with the profit probability distribution curve using the energy sale price.

6. The method of claim 5, further comprising repeating, by the server computing device, the execution of the load shifting optimization model for each combination of the plurality of demand response decision rules, the one or more price probability distribution curves, and the one or more load probability distribution curves to generate a plurality of profit values.

7. The method of claim 6, wherein the step of determining at least one of the profit probability distribution curves that has an optimal profit value comprises selecting the profit probability curve that is associated with a maximum profit value.

8. The method of claim 5, further comprising determining, by the server computing device, a risk value associated with the profit probability distribution curve using the energy sale price.

9. The method of claim 8, wherein the step of determining at least one of the profit probability distribution curves that has an optimal profit value comprises selecting the profit probability curve that is associated with a minimum risk value.

10. The method of claim 1, wherein the one or more operational parameters for each of a plurality of energy control devices comprise thermostat setpoints.

11. The method of claim 10, wherein the thermostat setpoints comprise a schedule of current and future temperature settings for the thermostat.

12. The method of claim 1, wherein the one or more operational parameters for each of a plurality of energy control devices comprise operational settings for a comfort device.

13. The method of claim 12, wherein the operational settings for a comfort device comprise a schedule of current and future operational settings for the comfort device.

14. A system for determining a load control schedule for a plurality of energy control devices using a load shifting optimization model and applying the load control schedule to adjust the plurality of energy control devices, the system comprising:
a server computing device that
receives one or more thermodynamic grey-box models, wherein each thermodynamic grey-box model is associated with one or more buildings;
receives energy price data associated with a utility provider servicing the one or more buildings and energy load forecast data associated with the one or more buildings;
generates one or more price probability distribution curves based upon the energy price data;
generates one or more load probability distribution curves based upon the energy load forecast data;
executes a load shifting optimization model using the one or more price probability distribution curves, the one or more load probability distribution curves, and an energy sale price to determine a profit probability distribution curve for each of a plurality of demand response decision rules;
determines at least one of the profit probability distribution curves that has an optimal profit value;
generates a load control schedule for each of a plurality of energy control devices coupled to the server computing device based upon the profit probability distribution curve that has the optimal profit value;
generates one or more operational parameters for each of the plurality of energy control devices using the load control schedule; and
transmits the one or more operational parameters to the plurality of energy control devices, wherein the energy control devices adjust one or more of current and future operational parameters based upon the received operational parameters.

15. The system of claim 14, wherein each thermodynamic grey-box model is based upon one or more characteristics of an indoor environment of a building and a flow of energy through an envelope of the building.

16. The system of claim 14, wherein the energy price data is one or more of historical energy price data and per-hour price probability data.

17. The system of claim 14, wherein the energy load forecast data is one or more of historical load data and load forecast probability data.

18. The system of claim 14, wherein the step of executing the load shifting optimization model comprises:
determining, by the server computing device, a demand response decision rule;
generating, by the server computing device, a vector of simulated market prices using at least one of the price probability distribution curves;
generating, by the server computing device, a vector of simulated loads using at least one of the load probability distribution curves;

applying, by the server computing device, the demand response decision rule to the vector of simulated market prices and the vector of simulated loads to generate the profit probability distribution curve for the demand response decision rule; and determining, by the server computing device, a profit value associated with the profit probability distribution curve using the energy sale price.

19. The system of claim 18, wherein the server computing device repeats the execution of the load shifting optimization model for each combination of the plurality of demand response decision rules, the one or more price probability distribution curves, and the one or more load probability distribution curves to generate a plurality of profit values.

20. The system of claim 19, wherein determining at least one of the profit probability distribution curves that has an optimal profit value comprises selecting the profit probability curve that is associated with a maximum profit value.

21. The system of claim 18, wherein the server computing device determines a risk value associated with the profit probability distribution curve using the energy sale price.

22. The system of claim 21, wherein determining at least one of the profit probability distribution curves that has an optimal profit value comprises selecting the profit probability curve that is associated with a minimum risk value.

23. The system of claim 14, wherein the one or more operational parameters for each of a plurality of energy control devices comprise thermostat setpoints.

24. The system of claim 23, wherein the thermostat setpoints comprise a schedule of current and future temperature settings for the thermostat.

25. The system of claim 14, wherein the one or more operational parameters for each of a plurality of energy control devices comprise operational settings for a comfort device.

26. The system of claim 25, wherein the operational settings for a comfort device comprise a schedule of current and future operational settings for the comfort device.

\* \* \* \* \*